US012602650B2

(12) United States Patent　　　　　(10) Patent No.: US 12,602,650 B2
Sharma et al.　　　　　　　　　　　　(45) Date of Patent: Apr. 14, 2026

(54) SYSTEMS AND METHODS FOR SUPPLY CHAIN MANAGEMENT

(71) Applicant: ACCENTURE GLOBAL SOLUTIONS LIMITED, Dublin (IE)

(72) Inventors: Swati Sharma, Bangalore (IN); Kishore P. Durg, Bangalore (IN); Melissa Twining-Davis, Wyoming, OH (US); Antoni Bardají Cusó, Barcelona (ES); Tamal Das, Bangalore (IN); Nirav Jagdish Sampat, Mumbai (IN); Saran Prasad, New Delhi (IN); Surya N S Chavali, Secunderabad (IN); Arvind Maheswaran, Bangalore (IN); Hitesh Bhagchandani, Bangalore (IN); Vinu Varghese, Bangalore (IN); Rishi Sareen, Ghaziabad (IN); Shiv Kamal Sinha, Haryana (IN); Anuradha Chari, Bangalore (IN); Mateenuddin Shaikh, Pune (IN); Ajay Divakar Naik, Bengaluru (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 202 days.

(21) Appl. No.: 18/128,678

(22) Filed: Mar. 30, 2023

(65) Prior Publication Data

US 2023/0351322 A1　　Nov. 2, 2023

(30) Foreign Application Priority Data

Mar. 31, 2022　(EP) ..................................... 22382309
Mar. 31, 2022　(IN) ............................. 202211019454

(51) Int. Cl.
　　*G06Q 10/087*　　(2023.01)
　　*G06Q 30/0202*　　(2023.01)

(52) U.S. Cl.
　　CPC ....... *G06Q 10/087* (2013.01); *G06Q 30/0202* (2013.01)

(58) Field of Classification Search
　　CPC ............. G06Q 10/087; G06Q 30/0202; G06Q 10/06315
　　See application file for complete search history.

(56) References Cited

U.S. PATENT DOCUMENTS

2013/0085813 A1　4/2013　Sharpe et al.
2018/0189731 A1　7/2018　Nossam
　　　　　　　　　(Continued)

FOREIGN PATENT DOCUMENTS

WO　　　2021/092260 A1　　5/2021

OTHER PUBLICATIONS

Intellectual Property India, "First Examination Report (FER) for Application No. 202314024514", Mailed on Jul. 31, 2025, 7 pages.
(Continued)

*Primary Examiner* — Michael Jared Walker
(74) *Attorney, Agent, or Firm* — Mannava & Kang, P.C.

(57) ABSTRACT

Systems and methods for evaluating attributes in supply chain management is disclosed. The system may receive data from a set of data sources corresponding to a supply chain associated with at least a product, pre-process the data based on integration of the data from each of the set of data sources, generate supply chain data based on the integrated data, analyze, via an orchestration engine, the supply chain data to assess an impact of the supply chain data on the supply chain, predict, via the orchestration engine, a state associated with a purchase event of the product in the supply chain, and generate a resolution flow to be executed in the supply chain for managing the predicted state associated with the purchase event of the product.

19 Claims, 15 Drawing Sheets

(56)                    References Cited

U.S. PATENT DOCUMENTS

| 2020/0143313 | A1 |   | 5/2020 | Ohlsson et al. |
|---|---|---|---|---|
| 2021/0158259 | A1 |   | 5/2021 | Evans et al. |
| 2022/0309436 | A1 | * | 9/2022 | Evans ................. G06Q 10/087 |
| 2023/0098602 | A1 | * | 3/2023 | Cella ..................... B25J 9/1674 |
|  |  |  |  | 700/248 |

OTHER PUBLICATIONS

Examination Report, CA Application No. 3,194,743 dated Oct. 7, 2025, 5 pages.

\* cited by examiner

700E

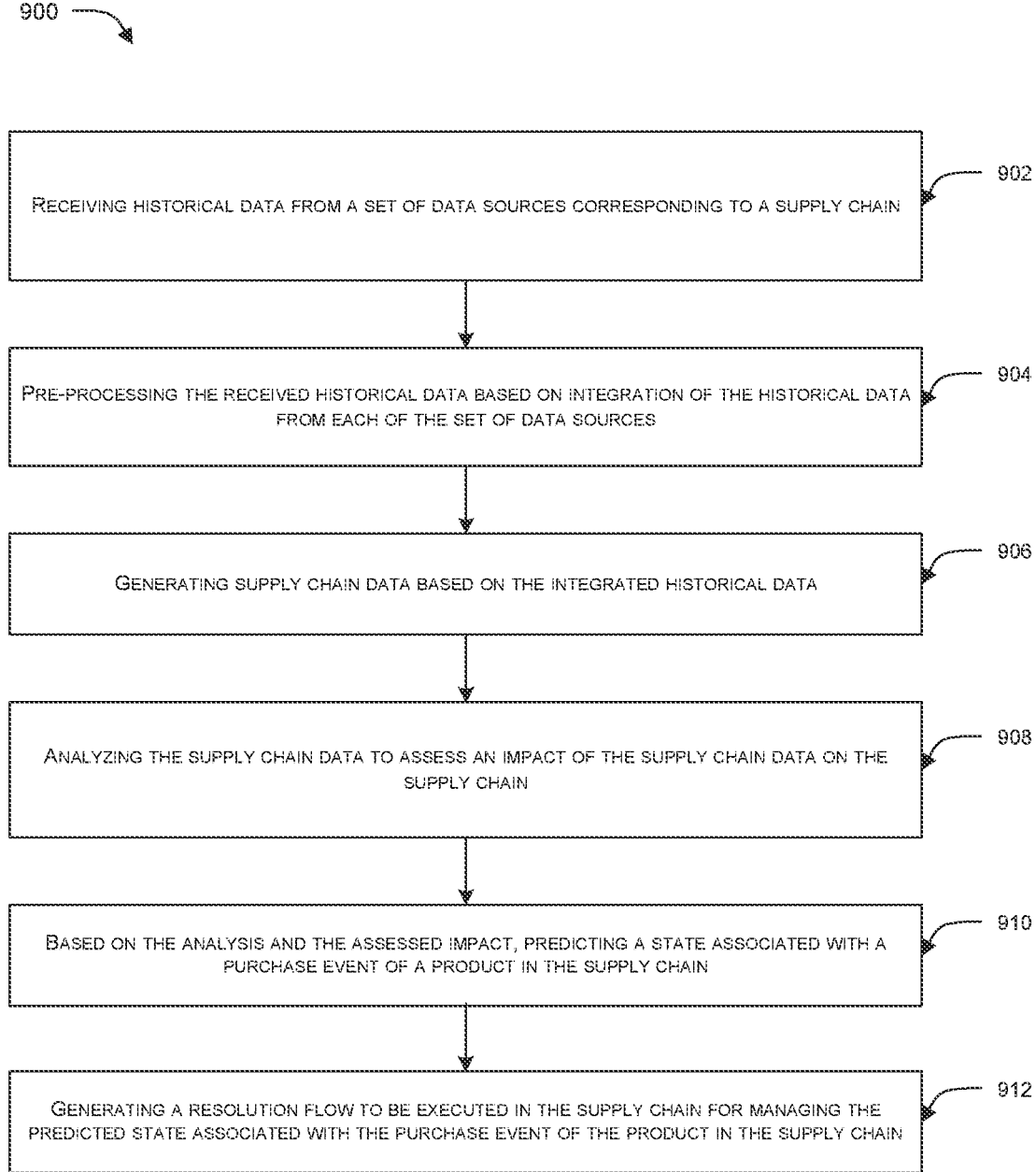

900

902
RECEIVING HISTORICAL DATA FROM A SET OF DATA SOURCES CORRESPONDING TO A SUPPLY CHAIN

904
PRE-PROCESSING THE RECEIVED HISTORICAL DATA BASED ON INTEGRATION OF THE HISTORICAL DATA FROM EACH OF THE SET OF DATA SOURCES

906
GENERATING SUPPLY CHAIN DATA BASED ON THE INTEGRATED HISTORICAL DATA

908
ANALYZING THE SUPPLY CHAIN DATA TO ASSESS AN IMPACT OF THE SUPPLY CHAIN DATA ON THE SUPPLY CHAIN

910
BASED ON THE ANALYSIS AND THE ASSESSED IMPACT, PREDICTING A STATE ASSOCIATED WITH A PURCHASE EVENT OF A PRODUCT IN THE SUPPLY CHAIN

912
GENERATING A RESOLUTION FLOW TO BE EXECUTED IN THE SUPPLY CHAIN FOR MANAGING THE PREDICTED STATE ASSOCIATED WITH THE PURCHASE EVENT OF THE PRODUCT IN THE SUPPLY CHAIN

FIG. 9

SYSTEMS AND METHODS FOR SUPPLY CHAIN MANAGEMENT

PRIORITY CLAIM

This application claims priority from Indian Provisional Patent Application No: 202211019454 filed at the Indian Patent Office on Mar. 31, 2022 and European Patent Application No. 22382309.7 filed with the European Patent Application on Mar. 31, 2022, the disclosures of which are incorporated by reference in their entirety herein.

BACKGROUND

Supply chain management may be broadly described as a flow of goods and services between businesses and locations. This may include movement and storage of raw materials, management of work-in-process inventory, and finished goods, order fulfilment from point of origin to point of consumption and other such aspects.

In an ever-increasing dynamic market, an end-to-end supply chain service management may be one of the key drivers of technology transformation. Traditional systems for supply chain management may focus only on planning, sourcing, manufacturing, delivery, and logistics and returns. However, conventional implementations may fail to focus on deeper study and evaluation of various metrics or attributes pertaining to supply chain performance. This may lead to limited or reduced reliability and efficiency of the overall performance.

SUMMARY

An embodiment of present disclosure relates to a system including a processor. The processor may be coupled with a memory. The memory may include instructions to be executed by the processor. The processor may receive data from a set of data sources corresponding to a supply chain associated with at least a product, pre-process the received data based on integration of the data from each of the set of data sources, generate supply chain data based on the integrated data, analyze, via an orchestration engine, the generated supply chain data to assess an impact of the generated supply chain data on the supply chain, and based on the analysis and the assessed impact, predict, via the orchestration engine, a state associated with an event in the supply chain. In an example embodiment, the state may include an attribute of the generated supply chain data causing the state. Further, the processor may generate a resolution flow to be executed in the supply chain for managing the predicted state associated with the event in the supply chain.

In an example embodiment, the data may include at least one of time stamp, product identifier, organization code, location, date, quantity, unit of measure, unit price, and currency.

In an example embodiment, the processor may be to pre-process the data by integrating the data received from each of the set of data sources, and cleaning and transforming the integrated data to remove anomalies.

In an example embodiment, the supply chain data may include demand forecast data, an optimized inventory plan, and a replenishment plan, and the attribute causing the state associated with the event may be based on the demand forecast data and the optimized inventory plan.

In an example embodiment, the processor may be to generate the demand forecast data by selecting a forecasting model based on the received data and a set of parameters associated with the product in the supply chain, and applying the selected forecasting model on the data and the set of parameters to generate the demand forecast data.

In an example embodiment, the processor may be to generate the optimized inventory plan by analyzing the received data, the generated demand forecast data, and transactional data, determining a recommended inventory norm based on the analyzed data, comparing current stock with a current inventory norm, and based on the determination and the comparison, determining the optimized inventory plan.

In an example embodiment, the processor may be to compare the current stock with the current inventory norm by determining whether the current stock is greater than a first threshold or less than a second threshold.

In an example embodiment, the processor may be to, in response to a positive determination, generate the optimized inventory plan based on the current inventory norm, in response to a negative determination, determine whether to override the current inventory norm with the recommended inventory norm, in response to a positive override determination, generate the optimized inventory plan based on the recommended inventory norm, and in response to a negative override determination, generate the optimized inventory plan based on the current inventory norm.

In an example embodiment, the processor may be to generate the replenishment plan based on the generated demand forecast data and the optimized inventory plan, and the replenishment plan may be associated with the event for the product in the supply chain.

In an example embodiment, the processor may be to predict the state associated with the event further based on the replenishment plan.

In an example embodiment, the state associated with the event may correspond to at least one of a delay, a priority, and a risk associated with the event in the supply chain.

In an example embodiment, the processor may be to analyze the generated supply chain by generating a set of prediction models for each unit in the supply chain, determining a best fit model from the set of prediction models for said each unit in the supply chain, and applying the determined best fit model on the generated supply chain data to assess the impact of the generated supply chain data on the supply chain and predict the state associated with the event.

In an example embodiment, the processor may be to generate the resolution flow for managing the predicted state by determining whether current stock of the product associated with the event is less than a safety threshold, in response to a positive determination, verifying and maintaining stock for the product based on an optimized inventory plan of the supply chain data, and in response to a negative determination, determining whether the current stock of the product is more than a maximum stock threshold. In an example embodiment, the processor may be to in response to a determination that the current stock of the product is more than the maximum stock threshold, create a request to consume the current stock based on demand forecast data of the supply chain data and the event, and in response to a determination that the current stock of the product is less than the maximum stock threshold, update the state for the product as optimal.

Another aspect of present disclosure relates to a method for supply chain management. The method may include receiving, by a processor, data from a set of data sources corresponding to a supply chain associated with at least a product, pre-processing, by the processor, the received data based on integration of the data from each of the set of data sources, generating, by the processor, supply chain data based on the integrated data, analyzing, by the processor via an orchestration engine, the generated supply chain data to assess an impact of the generated supply chain data on the supply chain, based on the analysis and the assessed impact, predicting, by the processor via the orchestration engine, a state associated with a purchase event of the product in the supply chain, where the state may include an identifier of the product and an attribute of the generated supply chain data causing the state, and generating, by the processor, a resolution flow to be executed in the supply chain for managing the predicted state associated with the purchase event of the product.

Yet another embodiment of the present disclosure relates to a non-transitory computer-readable medium comprising machine-executable instructions that may be executable by a processor to receive data from a set of data sources corresponding to a supply chain associated with at least a product, pre-process the received data based on integration of the data from each of the set of data sources, generate supply chain data based on the integrated data, analyze, via an orchestration engine, the generated supply chain data to assess an impact of the generated supply chain data on the supply chain, based on the analysis and the assessed impact, predict, via the orchestration engine, a state associated with a purchase event of the product in the supply chain, where the state may include an identifier of the product and an attribute of the generated supply chain data causing the state, and generate a resolution flow to be executed in the supply chain for managing the predicted state associated with the purchase event of the product.

BRIEF DESCRIPTION OF DRAWINGS

The accompanying drawings, which are incorporated herein, and constitute a part of this invention, illustrate exemplary embodiments of the disclosed methods and systems in which like reference numerals refer to the same parts throughout the different drawings. Components in the drawings are not necessarily to scale, emphasis instead being placed upon clearly illustrating the principles of the present invention. Some drawings may indicate the components using block diagrams and may not represent the internal circuitry of each component. It will be appreciated by those skilled in the art that invention of such drawings includes the invention of electrical components, electronic components or circuitry commonly used to implement such components.

FIG. 9 illustrates an exemplary flow diagram for the disclosed method for supply chain operational model, in accordance with some embodiments of the present disclosure.

Figure 1:
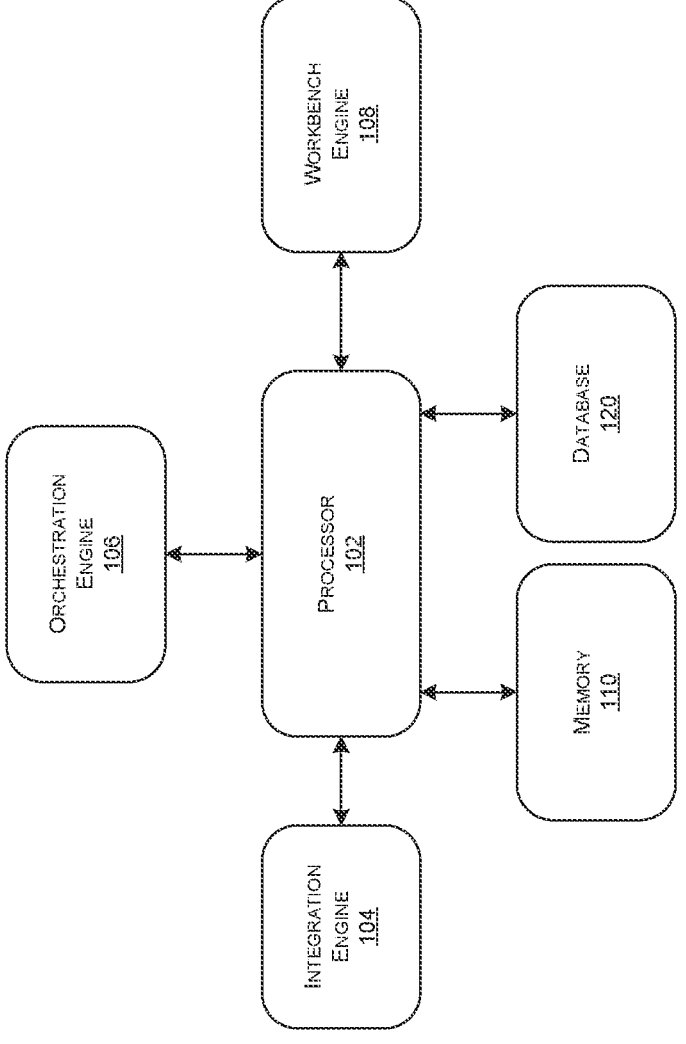
FIG. 1 illustrates an exemplary representation of a system for supply chain management, in accordance with some embodiments of the present disclosure.

The foregoing shall be more apparent from the following more detailed description of the disclosure.

DETAILED DESCRIPTION

In the following description, for the purposes of explanation, various specific details are set forth in order to provide a thorough understanding of embodiments of the present disclosure. It will be apparent, however, that embodiments of the present disclosure may be practiced without these specific details. Several features described hereafter can each be used independently of one another or with any combination of other features. An individual feature may not address all of the problems discussed above or might address only some of the problems discussed above. Some of the problems discussed above might not be fully addressed by any of the features described herein.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

Reference throughout this specification to "one embodiment" or "an embodiment" or "an instance" or "one instance" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items Various embodiments described herein provide a solution, in the form of a system and a method, for supply chain management. Specifically, the embodiments described herein provide a system and a method that may facilitate to address existing issues related to end-to-end supply chain service management. The embodiments described herein provide a system and a method that may facilitate a product vendor, a product manufacturer, or a product supplier to implement an intelligent supply chain operations to optimize human and machine workforce, enable work orchestration and data driven insights to deliver superior business performance, optimization of cost drivers, enhancement of experience outcomes, and other such aspects.

In an example embodiment, the system and method may facilitate at least one of supply chain planning, sourcing, supplier management, order management, logistics and fulfilment, repairs and warranty, and reverse logistics. The overall implementation of the system may lead to advantages in form of, for example, intelligent data quality transformation, productivity improvement, engineering data digitization process, automating test bench, optimizing inventory management, integrating spare parts management, optimizing warranty claims, and increasing forecast accuracy for spare parts. This may enable to make the system more reliable and more efficient. Several other advantages may be realized.

Various embodiments throughout the disclosure will be explained in conjunction with FIGS. 1-10.

FIG. 1 illustrates an exemplary representation of a system 100 for supply chain management, in accordance with some embodiments of the present disclosure. As shown in FIG. 1, the system 100 may be implemented by way of a single device or a combination of multiple devices that may be operatively connected or networked together. It may be appreciated that the described components/modules/engines may be implemented via a processor 102. The system 100 may be implemented in a hardware or a suitable combination of hardware and software. The processor 102 may be coupled with a memory 110 and a database 120. The memory 110 may store instructions to be executed by the processor 102. The processor 102 may include or may be operatively coupled to an integration engine 104, an orchestration engine 106, and a workbench engine 108.

In an example embodiment, the integration engine 104 may receive data from a set of data sources associated with a supply chain comprising a product and a service. The data may correspond to historical data. The term "product" may refer to goods or objects that may be supplied through a supply chain. The term "supply chain" may pertain to a physical, a virtual, or a network based storage and delivery of products by a vendor, manufacturer, or supplier to enable meeting a demand of an end user (also termed as an entity, a buyer, a client, or a customer). In an example embodiment, the set of data sources may include, but not be limited to, client systems including applications, web services, and files, external applications, partners, or the like. In an example embodiment, the set of data sources may provide the data related to, but not limited to, purchase orders and inventory, customer-related information, online sales orders, orders at aggregate level for suppliers, or the like.

In an example embodiment, the integration engine 104 may integrate the data received from each of the set of data sources. In an example embodiment, the integration engine 104 may clean the integrated data. In another example embodiment, the integration engine 104 may transform the clean data to remove anomalies from the data. For example, the integration engine 104 may perform at least one of standardization, missing value treatment, outlier correction, or the like, to clean and transform the integrated data. In an example embodiment, the integration engine 104 may use a set of models/algorithms to clean and transform the data such as, but not limited to, K-nearest neighbor, Cook's distance, difference in beta values (DFBETA), etc. A person of ordinary skill in the art will understand that K-nearest neighbor is a non-parametric, supervised learning classifier, which uses proximity to make classifications or predictions about grouping of an individual data point. Further, Cook's distance or D may refer to a regression analysis technique that is an estimate of an influence of a data point. Furthermore, DFBETA measures a difference in each parameter estimate with and without the influential point. It may be appreciated that the algorithms mentioned herein above do not comprise an exhaustive list, and may include any algorithm or technique within the scope of the present disclosure for data cleaning and data transformation. In an example embodiment, the integration engine 104 may facilitate generation of supply chain data utilizing the integrated data.

Therefore, in accordance with embodiments of the present disclosure, the integration engine 104 may serve as a central engine in the supply chain system 100. In particular, all components associated with the system 100 may cross over the integration engine 104 in order to connect and interact, and serve their respective functional aspects. In an example embodiment, the integration engine 104 may allow integration to be facilitated by data contracts to be established over multiple protocols and technologies, allowing either of the connecting consumer or publisher (i.e. request or response) to be modified/changed, without effecting the other side, and essentially establishing dependency segregation at the service integration level. In an example embodiment, the integration engine 104 may serve as a secure gateway for integration of data, where components connect according to the connection type and protocol required to communicate.

Referring to FIG. 1, the orchestration engine 106 may be an artificial intelligence (AI) enabled engine to drive seamless execution. In particular, the orchestration engine 106 may generate the supply chain data based on the gathered data such as the cleaned and transformed data from the integration engine 104. Further, the orchestration engine 106 may analyze the generated supply chain data and assess an impact of the generated supply chain data on the supply chain. In particular, the orchestration engine 106 may assess and/or determine the impact of the supply chain data on a particular unit in the supply chain such as, but not limited to, inventory, demand, shipment, etc.

In an example embodiment, the orchestration engine 106 may generate the supply chain data including, but not limited to, demand forecast data, optimized inventory norms or plan, replenishment plan, or the like, to facilitate seamless execution of all units in an end-to-end supply chain routine. Based on the generated supply chain data, the orchestration engine 106 may determine the impact on any unit of the supply chain, for example, corresponding to a purchase order associated with the product in the supply chain.

In an example embodiment, the orchestration engine 106 may utilize appropriate AI-based algorithms to predict a state associated with the purchase order of the product in the supply chain based on the generated supply chain data, i.e., the demand forecast data, the optimized inventory plan, and the replenishment plan. The state associated with the purchase order may include an identifier of the product and at least one attribute of the supply chain data causing the state associated with the purchase order. It may be appreciated that the terms "purchase order" and "purchase event" may be used interchangeably throughout the disclosure, but may refer to the same meaning. That is, a purchase order may refer to a document that a user may send to a supplier or vendor to authorize a purchase. Purchase order may outline what services and/or products the buyer would like to purchase and how much of it they would like to receive. In an example embodiment, the state associated with the purchase order may correspond to a delay, a risk, and a priority associated with the purchase order of the product in the supply chain. It may be understood that the purchase order may correspond to a request for purchase of a single or multiple products from the inventory and/or services in the supply chain. In an example embodiment, the orchestration engine 106 may generate a resolution flow to be executed in the supply chain for effectively managing the predicted state associated with the purchase order of the product in the supply chain. The orchestration engine 106 may take into account the assessed impact of the generated supply chain data on the supply chain while generating the resolution flow.

In an example embodiment, the workbench engine 108 may facilitate, based on the generated resolution flow, an execution of at least one task for effectively managing the predicted state associated with the purchase order of the product. For example, if the state associated with the purchase order of the product is predicted as high priority, then the workbench engine 108 in conjunction with the orchestration engine 106 may trigger the concerned units in the supply chain to execute and/or close the purchase order on priority.

Therefore, the orchestration engine 106 and the workbench engine 108 may provide high configurability in terms of modular building blocks, configurable functions, or the like. Further, the orchestration engine 106 and the workbench engine 108 may facilitate scalability in terms of domain separation and multi-tenancy, features and data model inheritance, scoped application, standards-based work orchestration in one interface, etc.

It may be appreciated that various other steps and substeps may be possible for each of the components of the system 100 within the scope of the present disclosure.

In an example embodiment, the above-mentioned aspects may be explained with an example, for ease of understanding. In this example, a purchase order/event may be captured based on integration and ingestion of data from the set of data sources, for example, a goods receipt. In this example, the state associated with the purchase event may correspond to a delay in supplying the product. Based on assessment, the system 100 may evaluate the corresponding impact of the generated supply chain data on the supply chain, and essentially, on the purchase event with respect to an entity (i.e., an end user, or client, or customer), where the impact may pertain to, for example, stock outs. Based on the assessed impact, the system 100 may trigger a resolution flow, such as, for example, supplier responsiveness for improvement. Based on the resolution flow, the system 100 may mitigate the state associated with the purchase event by executing a task such as, for example, transfer of goods from another storage location to prevent the stock outs. It may be appreciated that the above-mentioned example may only be exemplary and several other types of issues or problems related to the supply chain may be evaluated and/or mitigated by the system 100 and method, as disclosed herein.

Referring to FIG. 1, the system 100 may be a hardware device including the processor 102 executing machine-readable program instructions to perform one or more operations related to evaluation. Execution of the machine-readable program instructions by the processor 102 may enable the proposed system 100 to perform one or more functions. The "hardware" may comprise a combination of discrete components, an integrated circuit, an application-specific integrated circuit, a field programmable gate array, a digital signal processor, or other suitable hardware. The "software" may comprise one or more objects, agents, threads, lines of code, subroutines, separate software applications, two or more lines of code or other suitable software structures operating in one or more software applications or on one or more processors. The processor 102 may include, for example, microprocessors, microcomputers, microcontrollers, digital signal processors, central processing units, state machines, logic circuits, and/or any devices that manipulate data or signals based on operational instructions. Among other capabilities, the processor 102 may fetch and execute computer-readable instructions from the memory 110 operationally coupled with system 100 for performing tasks such as data processing, input/output processing, feature extraction, and/or any other functions. Any reference to a task in the present disclosure may refer to an operation being, or that may be, performed on data or input information.

Although FIG. 1 shows exemplary components of the system 100, in other embodiments, the system 100 may include fewer components, different components, differently arranged components, or additional functional components than depicted in FIG. 1. Additionally, or alternatively, one or more components of the system 100 may perform functions described as being performed by one or more other components of the system 100.

Figure 2:
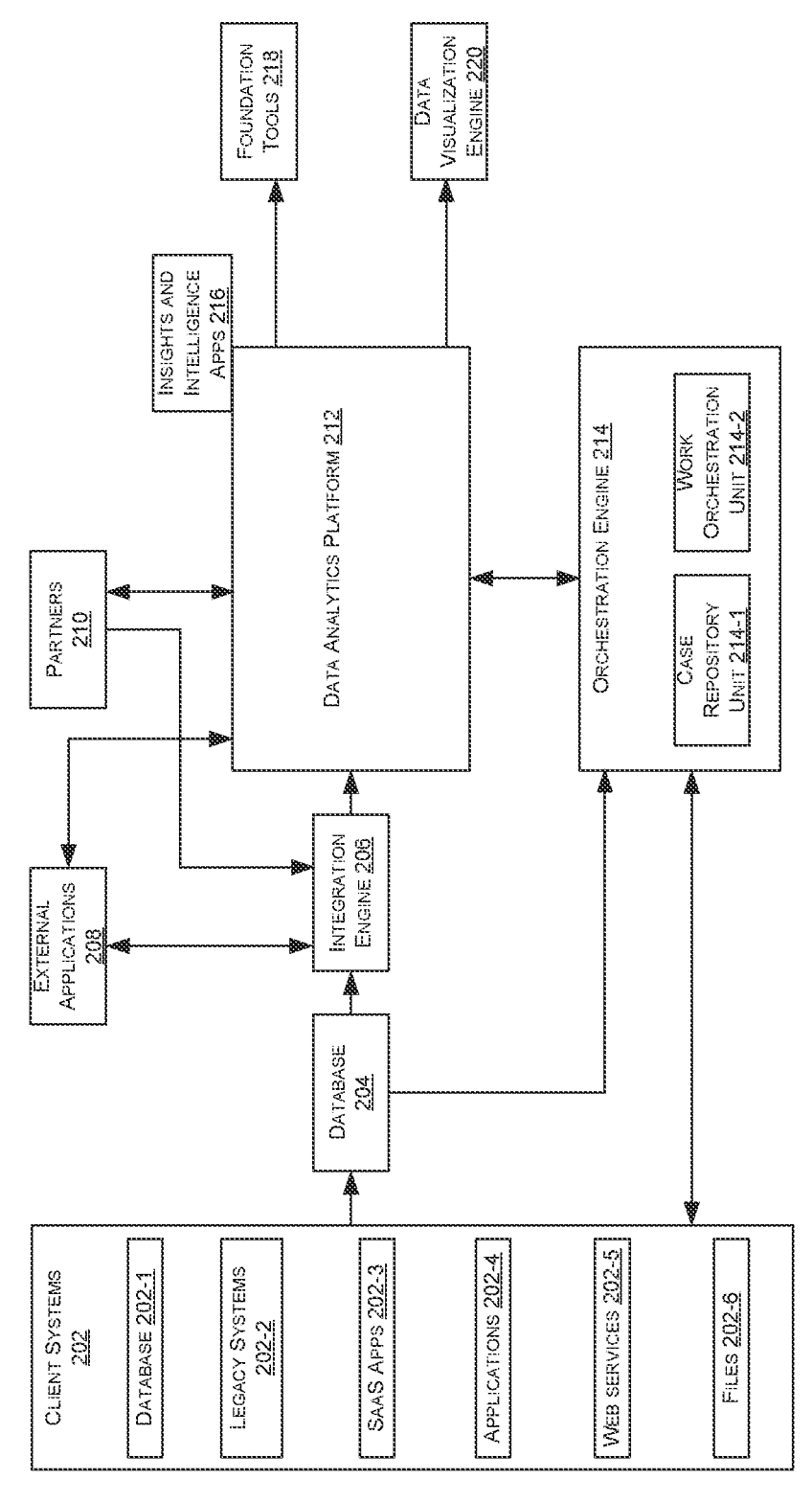
FIG. 2 illustrates an exemplary network architecture for implementing the proposed system for supply chain management, in accordance with some embodiments of the present disclosure.

FIG. 2 illustrates an exemplary network architecture 200 for implementing the proposed system for supply chain management, in accordance with some embodiments of the present disclosure.

Referring to FIG. 2, the network architecture 200 may include client systems 202, a database 204, an integration engine 206, external applications 208, partners 210, data analytics platform 212, an orchestration engine 214, insights and intelligence applications 216, foundation tools 218, and data visualization engine 220. It may be understood that the integration engine 206 and the orchestration engine 214 may be similar to the respective integration engine 104 and the orchestration engine 106 of FIG. 1 in their functionality.

In an example embodiment, the integration engine 206 may include one or more engines/modules/sublayer components to receive and ingest data from one or more external systems managed by the system such as the system 100 of FIG. 1. For example, the integration engine 206 may receive the data pertaining to, for example, collective data from the client systems 202, an occurred event, an alarm or an urgent requirement, a request from a user or an end entity, or other such types of situations. In an example embodiment, the client systems 202 may include, but not limited to, database 202-1, legacy systems 202-2, software as a service (SaaS) applications 202-3, applications 202-4, web services 202-5, and files 202-6.

Referring to FIG. 2, data from the client systems 202 may be stored at the database 204, and the integration engine 206 may ingest the data from the database 204. In an example embodiment, the integration engine 206 may receive data from the external applications 208 as well as from other supply chain partners 210.

In an example embodiment, the integration engine 206 may ingest or process the data from all sources to capture a purchase order/event and create a corresponding case for further processing at the data analytics platform 212, the orchestration engine 214, and/or the insights and intelligence applications 216. In an example embodiment, the integration engine 206 may be customized for every new data source or client or entity based on requirement(s). Furthermore, the integration engine 206 may include at least three sublayer components such as, but not limited to, a neutral sublayer component, a system sublayer component, and a client sublayer component. The neutral sublayer component may correspond to a set of endpoints which may be used for rest of the components in the network architecture 200 or the at least one client system 202. In an example embodiment, the neutral sublayer component may enable neutrality of the remaining layers of the at least one client system 202. Furthermore, the system sublayer component may correspond to a set of endpoints which may be specialized based on a specific type of system. The system sublayer component may allow the proposed system 100 to optimally reuse connectivity capabilities across one or more client systems 202. In an exemplary embodiment, the one or more client systems 202 may be same or different versions of the specific type of system. The client sublayer component may drive the connection to the right client system of the at least one client system 202. The client sublayer component may be customized based on a client environment. Various other aspects may be possible within the scope of the present disclosure.

Referring to FIG. 2, the orchestration engine 214 may correspond to a set of capabilities used to manage requests (or integrated data) that need to be evaluated by the system 100. In an example embodiment, the orchestration engine 214 may include a plurality of sublayers/subunits/subsystems such as, for example, a case repository unit 214-1 and a work orchestration unit 214-2. The case repository unit 214-1 may be configured to store the data pertaining to captured event (or corresponding case). In an example embodiment, the data may be received through the set of data sources including at least one of a client system (or entity system) 202, one or more internal sources which may be within the system 100 such as the data analytics platform 212, or one or more external sources which may be outside the system 100. In an example embodiment, the data analytics platform 212 may clean and/or transform the integrated data received from the integration engine 206. In another embodiment, the integration engine 206 may clean and/or transform the integrated data.

In an example embodiment, the work orchestration unit 214-2 may be configured to receive the captured event as one or more requests/case. The work orchestration unit 214-2 may classify each request/case (pertaining to the captured event) and trigger a resolution flow of one or more clusters associated with the requests. In an example embodiment, the resolution flow may be triggered in an automated way. In an alternate example embodiment, the resolution flow may require partial or complete human intervention and may be performed through a workbench engine such as the workbench engine 108 of FIG. 1. In an example embodiment, tasks pertaining to the resolution flow may be identified through use of digital services library. Further steps implemented by the orchestration engine 214 may include, for example, intelligent workload allocation (for executing the resolution flow), performing the orchestration of a next task, execution of further analytics, and other such steps.

In an example embodiment, the orchestration engine 214 may include a first connector representative of a library with endpoints that may connect the orchestration engine 214 with external resources. In an exemplary embodiment, the external resources may include at least one of a transportation management system (TMS), an inventory optimizer, or the like, wherein these layers may be structured with the same layers as of the integration engine 206. In an example embodiment, the first connector may be system agnostic and if required, the first connector may allow to replace any technology component by other technology. Several other similar embodiments may be possible within the scope of the present disclosure.

Further, the orchestration engine 214 may include a second connector representative of a library with endpoints that may connect the orchestration engine 214 with one or more external notification resources. In an embodiment, the second connector may be a notification connector. The second connector may be structured with same layers as of the integration engine 206.

Referring to FIG. 2, in an example embodiment, the orchestration engine 214 may also include the workbench engine 108. In another example embodiment, the workbench engine 108 may be separate from the orchestration engine 214. The workbench engine 108 may operate in an automated manner. In an alternate example embodiment, the workbench engine 108 may be configured to provide a frontend interface for an administrative user or agent to execute one or more tasks received from the orchestration engine 214 for managing a predicted state associated with the captured event in the supply chain. In an example embodiment, the workbench engine 108 may receive the resolution flow and/or workload allocation from the orchestration engine 214 to enable execution of the task pertaining to the resolution flow. The output of task execution, i.e., execution of the resolution flow, may be informed back to the orchestration engine 214. Upon receiving the output of task execution, the case may be closed at the orchestration engine 214. In an example, the workbench engine 108 may include a dashboard associated to the system and a supply chain dashboard.

Referring to FIG. 2, the data analytics platform 212 may work in conjunction with the insights and intelligence applications 216 and the orchestration engine 214. The insights and intelligence applications 216 may store the integrated data including historical data as well as the resolution flow(s) generated at the orchestration engine 214 for analysis. In an example embodiment, the insights and intelligence applications 216 analyze all the data gathered from various components in the network architecture 200 to generate insights that may be used for future requests/cases for effective management of various units in the supply chain. In an example embodiment, the generated analysis, insights, resolution flows, or the like may be provided to the foundation tools 218 operating in the architecture 200 and to the data visualization engine 220 for further processing.

In an example embodiment, the system 100 and the network architecture 200 for supply chain management may include external processors such as, for example, planning tools to execute analytics, which may be based on AI and machine learning (ML) capabilities, to perform simulations. The simulations may include, for example, stock projection of a product on source storage location and the need for replenishment in the event of a stock out, trigger for safety stock threshold, or time bound replenishment from another storage location, or the like. Various other examples or information may be processed through the simulations to obtain deeper insights on potential root and/or resolution flow for mitigation for upcoming cycle of analysis. In an example embodiment, the orchestration engine 214 may also use communication and visibility capabilities like ticketing tools or a portal to exchange information with internal and external stakeholders and manage the end-to-end supply chain events. Several other similar embodiments may be possible with the scope of the present disclosure.

Although FIG. 2 shows exemplary components of the network architecture 200, in other embodiments, the network architecture 200 may include fewer components, different components, differently arranged components, or additional functional components than depicted in FIG. 2. Additionally, or alternatively, one or more components of the network architecture 200 may perform functions described as being performed by one or more other components of the network architecture 200.

Figure 3:
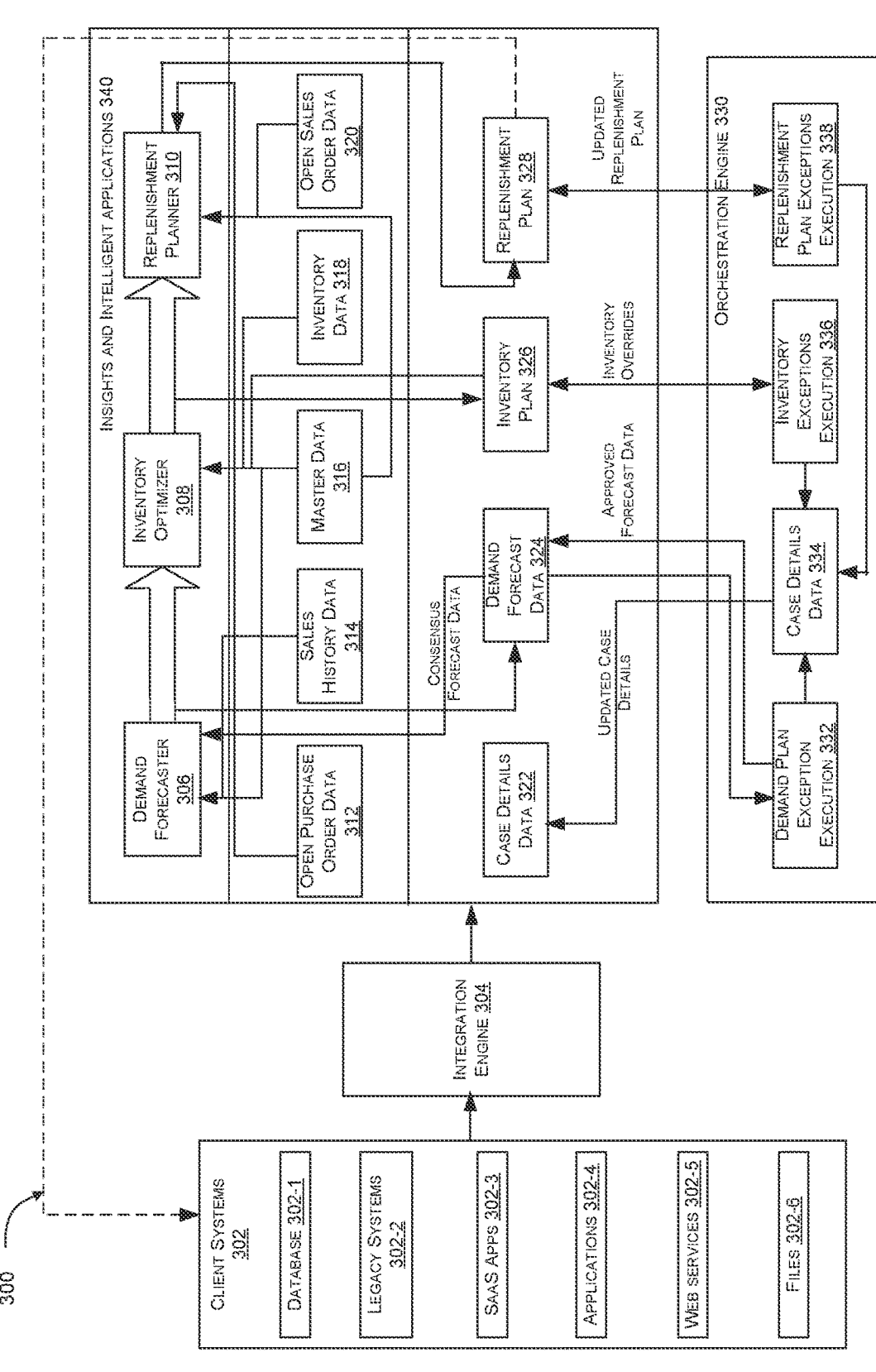
FIG. 3 illustrates an exemplary representation for implementing a work orchestration engine of the proposed system, in accordance with embodiments of the present disclosure.

FIG. 3 illustrates an exemplary representation 300 for implementing a work orchestration engine of the system, in accordance with embodiments of the present disclosure.

Referring to FIG. 3, there is illustrated client systems 302 including database 302-1, legacy systems 302-2, SaaS applications 302-3, applications 302-4, web services 302-5, and files 302-6, integration engine 304, insights and intelligence applications 340 implemented in a data analytics platform (such as 212 of FIG. 2), and an orchestration engine 330. It may be appreciated that the client systems 302, the integration engine 304, the insights and intelligence applications 340, and the orchestration engine 330 may be similar to the respective clients systems 202, the integration engine 204, the insights and intelligence applications 216, and the orchestration engine 214 of FIG. 2 in their functionality.

As described with reference to FIG. 2, the integration engine 304 may ingest and integrate data from the client systems 302. In an example embodiment, the integration engine 304 may send the integrated, in some embodiments, after cleaning and transforming, to the insights and intelligence applications 340 (i.e., the data analytics platform 212) and/or the orchestration engine 330.

In an example embodiment, the orchestration engine 330 may generate supply chain data from the data received from the integration engine 304. The data received from the integration engine 304 may include, but not limited to, open purchase order data 312, sales history data 314, master data 316 including site master data, item master data, and supplier master data, inventory data 318, and open sales order data 320. In an example embodiment, the orchestration engine 330 may generate the supply chain data including, but not limited to, demand forecast data 324, optimized inventory plan 326, and replenishment plan 328. In an example embodiment, the orchestration engine 330 may determine a state associated with a purchase order of a product in the supply chain, where the state may include an attribute of the generated supply chain data causing the state associated with the purchase order. In an example embodiment, the state may correspond to a delay, a risk, and a priority associated with the purchase order of the product. Further, in an example embodiment, the attribute of the state may be based on the generated supply chain data such as the demand forecast data 324, the inventory plan 326, and the replenishment plan 328.

In an example embodiment, a demand forecaster 306 may generate the demand forecast data 324 based on the data received from the integration engine 304. Specifically, the demand forecaster 306 may generate the demand forecast data 324 based on the sales history data 314, the master data 316, and stored demand forecast data 324.

In an example embodiment, the sales history data 314 may include last three years data such as, but not limited to, material number, product identifier (ID), organization code/description, customer ID, ship to (location), order date, requested date, promised delivery date, actual delivery date, sales order quantity and value, unit of measure, unit price, currency, installed base data, event flag (if available), unfulfilled back orders, etc.

In an example embodiment, the master data 316 may include latest data such as, but not limited to, material number, product ID, material description, business unit, material group, sub-group, unit price, currency, unit of measure, product launch date, product phase out date, product status-new/active/inactive, business-specific fields/flags, bill of materials, lead time, customer service levels, customer service time, or the like.

In an example embodiment, the stored (historical) demand forecast data 324 may include, but not be limited to, forecast version month/week (stamp), material number, product ID, organization code/description, ship to (location), forecast date (12 months horizon for each launched forecast), forecast quantity, unit of measure, or the like.

Referring to FIG. 3, in an example embodiment, the demand forecaster 306 may generate the demand forecast data 324 by selecting a forecasting model based on the sales history data 314, the master data 316, and the stored demand forecast data 324. For example, the demand forecaster 306 may select the forecasting model based on, but not limited to, product type, sales pattern, or the like. Further, the demand forecaster 306 may apply the forecasting model on these set of data to generate the demand forecast data 324. For example, the demand forecaster 306 may utilize a back testing method to select the forecasting model. A person of ordinary skill in the art will understand that the back testing method may refer to a technique in which an algorithm may be trained on data from a certain time period and then test its performance on older data. Such algorithms may include, for example, clustering analysis, outlier analysis, factor analysis, and regression analysis.

In an example embodiment, the demand forecaster 306 may utilize attributes significance testing for the same. As an example but not limitation, one or more models may be utilized to select a best fit model such as, but not limited to, time series model, regression model, and ML model.

The time series models may include, but not limited to, autoregressive integrated moving average (ARIMA), Error, Trend, Seasonal (ETS), Holt-Winters, or the like. A person of ordinary skill in the art will understand that ARIMA may refer to a subset of linear regression models that attempts to use past observations of a target variable to forecast its future values. ETS may refer to an approach method for forecasting time series univariate. Further, Holt-Winters may model three aspects of the time series, a typical value (average), a slope (trend) over time, and a cyclical repeating pattern (seasonality).

The regression models may include, but not limited to, multiple linear regression (MLR), Robust, least absolute shrinkage and selection operator (LASSO), or the like. A person of ordinary skill in the art will understand that MLR or multiple regression may refer to a statistical technique that uses several explanatory variables to predict an outcome of a response variable. Robust is statistics with good performance for data drawn from a wide range of probability distributions, especially for distributions that are not normal. Further, LASSO may refer to a statistical formula whose main purpose is feature selection and regularization of data models.

The ML models may include, but not limited to, Extreme Gradient Boosting (XGBoost), Support Vector Regression (SVR), Random Forest, neural networks, or the like. A person of ordinary skill in the art will understand that XGBoost may refer to a salable, distributed gradient-boosted decision tree ML library. Gradient boosting is a supervised learning algorithm, which attempts to accurately predict a target variable by combining the estimates of a set of simpler, weaker models. SVR may refer to an ML model that can be used in classification problems or assigning classes when the data is not linearly separable. Further, Random Forest may refer to an ML algorithm that combines the output of multiple decision trees to reach a single result.

In an example embodiment, based on the selection of the best fit model for each unit in the supply chain, the demand forecaster 306 may generate the demand forecast data 324. For example, the demand forecaster 306 may use what-if simulations, ensembles, statistical tests for validation, etc. to generate accurate demand forecast data 324.

In an example embodiment, the demand forecast data 324 may be provided to a demand plan exception execution module 332 that may analyze the generated demand forecast data 324 and take into consideration one or more minor demand plan exceptions, for example, but not limited to, forecast accuracy improvement, replenishment improvement, etc. The demand plan exception execution module 332 may approve the generated demand forecast data 324 and store/publish it as case details data 334 for future use. In an example embodiment, the demand forecaster 306 may provide the generated demand forecast data 324 to an inventory optimizer 308 for further processing.

Referring to FIG. 3, the inventory optimizer 308 may generate the inventory plan (or the optimized inventory plan) 326 based on the demand forecast data 324 generated by the demand forecaster 306, the master data 316, the inventory data 318, and stored (current or historical) inventory plan 326.

In an example embodiment, the inventory data 318 may include last three years data such as, but not limited to, material number, material description, class number, unit of measure, plant, lot size type, safety stock, reorder point, maximum stock level, fixed lot size, plant material status, lead time, plan/customer service level, stock quantity, unit cost, currency, total cost, exchange rate, or the like.

In an example embodiment, the inventory optimizer 308 may consider transactional data including inventory history (position) data, but not limited to the like, to generate the optimized inventory plan 326. For example, the inventory history data may include last one year data such as, but not limited to, material number, product ID, organization code/description, warehouse ID and location, date (1st day of the month), inventory volume, inventory value, or the like.

In an example embodiment, the inventory optimizer 308 may analyze the data, i.e. the demand forecast data 324, the master data 316, the inventory data 318, and the stored inventory plan 326 to generate a recommended inventory norm/plan. The inventory optimizer 308 may compare current stock with a current inventory norm, and generate the optimized inventory plan 326 based on the comparison. In an example embodiment, the inventory optimizer 308 may determine whether the current stock is greater than a first threshold or less than a second threshold. In an example embodiment, the first threshold may refer to 1.1 times the current inventory norm 326. In an example embodiment, the second threshold may refer to 0.9 times the current inventory norm 326. In an example embodiment, the first threshold may refer to a safety stock threshold, i.e. minimum stock required to avoid stockouts, and the second threshold may refer to a maximum inventory threshold, i.e. maximum stock to avoid over stock.

In response to a positive determination, i.e. the current stock being greater than the first threshold or less than the second threshold, the inventory optimizer 308 may generate the optimized inventory plan 326 based on the current inventory norm. For example, in such a scenario, the inventory optimizer 308 may not override the current inventory norm with the recommended inventory norm. In another embodiment, in response to a negative determination, that is, the current stock being less than the first threshold or more than the second threshold, the inventory optimizer 308 may determine whether to override the current inventory norm with the recommended inventory norm. Based on a positive override determination, the inventory optimizer 308 may generate the optimized inventory plan 326 based on the recommended inventory norm. However, based on a negative override determination, the inventory optimizer 308 may generate the optimized inventory plan 326 based on the current inventory norm. In an example embodiment, the inventory norm/plan 326 may be optimized at a single location level.

In an example embodiment, the optimized inventory plan 326 may be provided to an inventory exceptions execution module 336 that may analyze the optimized inventory plan 326 and take into consideration one or more minor inventory plan exceptions, for example, but not limited to, economic order quality, optimal order quality, stockouts, and over-stocks, etc. The inventory exceptions execution module 336 may override the optimized inventory plan 326 based on the exceptions and store/publish it as case details data 334 for future use. In an example embodiment, the inventory optimizer 308 may provide the optimized inventory plan 326 to a replenishment planner 310 for further processing.

Referring to FIG. 3, the replenishment planner 310 may generate a replenishment plan 328 for the supply chain based on the demand forecast data 324, the optimized inventory plan 326, the open purchase order data 312, the master data 316, and open sales order data 320. In an example embodiment, the replenishment plan 328 may be associated with a purchase order for a product in the supply chain.

In an example embodiment, the replenishment planner 310 may generate a replenishment order associated with the replenishment plan 328. Thereafter, a shipment ID may be created. Further, the replenishment planner 310 may select a carrier, prepare an item list, get labels from carrier forwarder, and monitor the shipment. Based on this, the replenishment planner 310 may update the stored data as well as inventory.

In an example embodiment, the replenishment plan 328 may be provided to a replenishment plan exceptions execution module 338 that may analyze the replenishment plan 328 and take into consideration one or more minor replenishment plan exceptions, for example, but not limited to, distribution planning, kits, Bill of Materials, and Bill of Distribution. The replenishment plan exceptions execution module 338 may update the replenishment plan 328 based on the exceptions and store/publish it as case details data 334 for future use. In an example embodiment, the replenishment planner 310 may provide the replenishment plan 328 to the client systems 302 and to supplier delivery assurance engine (not shown). In an example embodiment, the supplier delivery assurance engine may be part of the orchestration engine 330 and/or the insights and intelligent applications 340.

In an example embodiment, the supplier delivery assurance engine may predict purchase orders which could be potentially delayed or be under high risk. For example, the orchestration engine 330 and/or the insights and intelligence applications 340 may predict a state associated with each purchase order based on an assessment of impact of the generated supply chain data on the supply chain. The state may correspond to a delay, a risk, or a priority associated with the purchase order. In an example embodiment, the state may include, but not be limited to, an ID of the product and an attribute of the supply chain data causing or leading to the predicted state for the purchase order.

In an example embodiment, the supplier delivery assurance engine may predict the state of the purchase orders based on the replenishment plan 328, the master data 316, the sales history data 314, the inventory data 318, the open sales order data 320, and the open purchase order data 312. Based on the prediction, the supplier delivery assurance engine may send the predicted state to each of the demand forecaster 306, the inventory optimizer 308, and the replenishment planner 310. In an example embodiment, the orchestration engine 330 and/or the insights and intelligence applications 340 may generate a resolution flow for managing the predicted state for the purchase order.

In an example embodiment, the demand forecaster 306, the inventory optimizer 308, the replenishment planner 310, and the supplier delivery assurance engine may consider holiday data, consumption data, and service level data received from the integration engine 304. In an example embodiment, the holiday data may include data of last two years and next one year such as, but not limited to, date, ship to (location), holiday/event/special period description, event/holiday type, or the like. In an example embodiment, the consumption data may include last three years data such as, but not limited to, material, material description, plant/warehouse, movement type, goods issuance/receipt date, batch, quantity, unit of measure, purchase order/issuance order number, total cost, or the like. In an example embodiment, the service level data may include last one year data such as, but not limited to, material number, product ID, organization code/description, ship to (location), date (month), total units ordered, total units fulfilled, service level percentage, or the like.

It may be appreciated that the data examples are not exhaustive, and may consider any other type of data that may be considered for analysis within the scope of the present disclosure. It may be appreciated that the exemplary representation 300 may be modular and flexible to accommodate any kind of changes in the representation 300.

Figure 4:
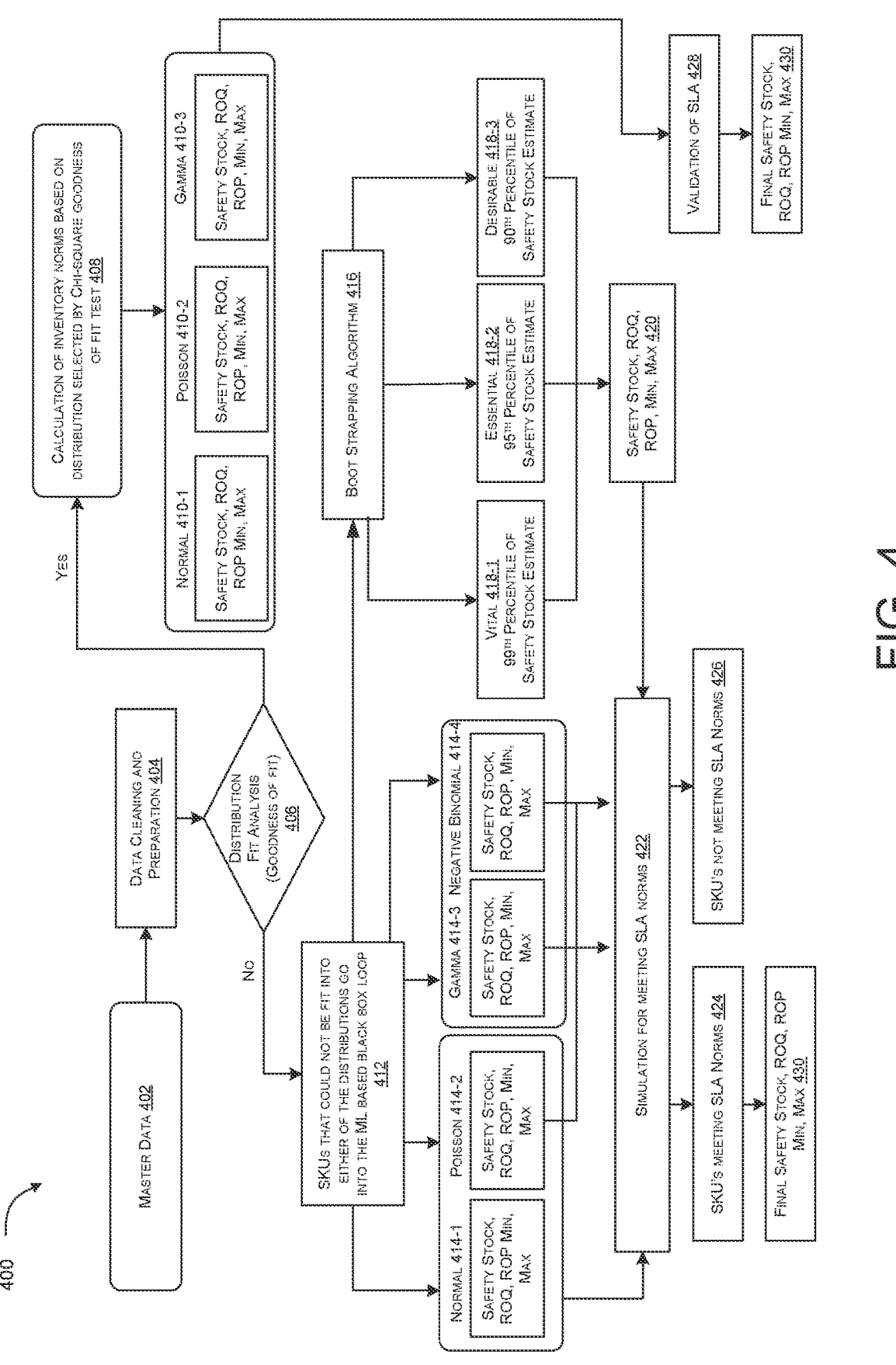
FIG. 4 illustrates an exemplary flow chart of a method implemented by an inventory optimizer of the proposed system, in accordance with some embodiments of the present disclosure.

FIG. 4 illustrates an exemplary flow chart 400 of a method implemented by an inventory optimizer such as the inventory optimizer 308 of the system, in accordance with some embodiments of the present disclosure.

Referring to FIG. 4, at step 402, the method 400 may include receiving master data such as master data 316 of FIG. 3. In an example embodiment, the inventory optimizer may receive the master data. In another example embodiment, the inventory optimizer may receive additional transactional data for analysis.

At step 404, the method 400 may include cleaning and preparing the received data. In an example embodiment, the inventory optimizer may remove anomalies from the received data by performing standardization, missing value treatment, outlier correction, transformation, or the like.

Referring to FIG. 4, at step 406, the method 400 may include performing distribution fit analysis, i.e. goodness of fit on the cleaned data. A person of ordinary skill in the art will understand that goodness of fit test may refer to a statistical test that determines how well sample data fits a distribution from a population with a normal distribution. In an example embodiment, the inventory optimizer may perform chi-square goodness of fit test on the cleaned data. Further, at step 408, the method 400 may include calculating inventory norms, i.e. recommended inventory norms based on the distribution selected by the goodness of fit test. Based on the calculation, the method 400, at step 410, includes distributing or categorizing stocks in the inventory as Normal 410-1, Poisson 410-2, and Gamma 410-3. In an example embodiment, the inventory optimizer may determine respective thresholds for safety stock, reorder quantity (ROQ), reorder point (ROP), minimum threshold, maximum threshold, or the like, for each of the categories.

Thereafter, at step 428, the method 400 may include validating service-level agreements (SLAs) based on the inventory, and at step 430, the method 400 may include determining the final safety stock threshold and other relevant data parameters for the inventory.

Referring to FIG. 4, at step 412, the method 400 may include moving stock keeping units (SKUs) that could not be fit into either distribution to an ML based black box loop such that at step 414, the stock is categorized as Normal 414-1, Poisson 414-2, Gamma 414-3, and Negative binomial 414-4. At step 416, boot strapping algorithms may be applied to the remaining stock to get 99th percentile of safety stock estimate as vital 418-1, $95^{th}$ percentile of the safety stock estimate as essential 418-2, and $90^{th}$ percentile of the safety stock as desirable 418-3. From these categories, at step 420, the method 400 may include obtaining the respective thresholds for safety stock, ROQ, ROP, minimum and maximum threshold, and providing this data for simulation for meeting SLA norms at step 426. Further, at step 426, the method 400 may include identifying SKUs that do not meet the SLA norms. In another example embodiment, at step 424, the method 400 may include identifying SKUs that meet the SLA norms, and from these, obtaining the final safety stock threshold, ROQ, ROP, minimum, and maximum thresholds at step 430.

Therefore, the inventory optimizer may optimize an inventory plan for effective supply chain management. It will be appreciated that the steps shown in FIG. 4 are merely illustrative. Other suitable steps may be used to implement inventory optimizer, if desired. Moreover, the steps of the method 400 may be performed in any order and may include additional steps.

Figure 5:
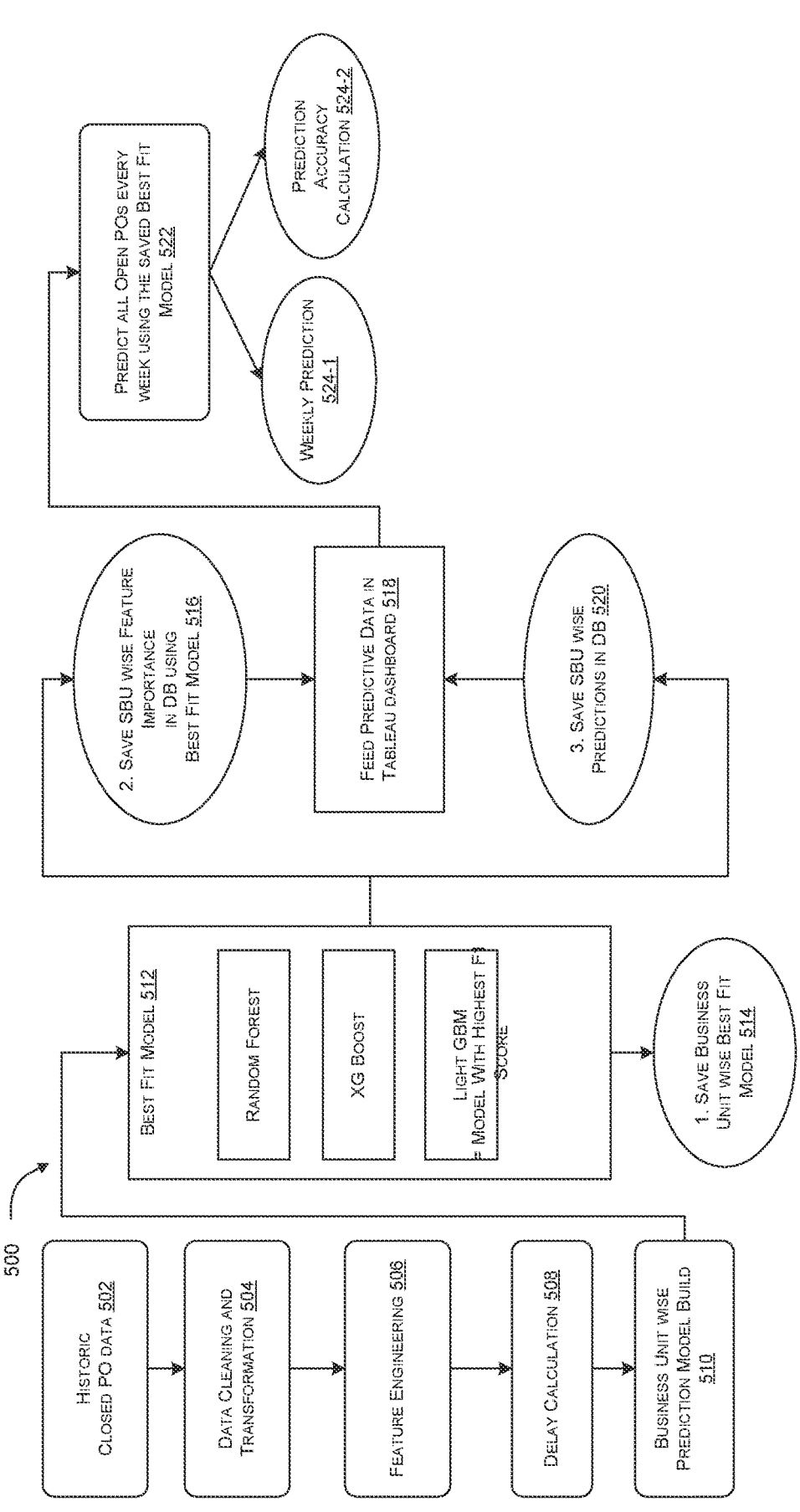
FIG. 5 illustrates an exemplary flow chart of a method implemented by a upplier assurance delivery engine of the proposed system, in accordance with some embodiments of the present disclosure.

FIG. 5 illustrates an exemplary flow chart 500 of a method implemented by a supplier assurance delivery engine of the system, in accordance with some embodiments of the present disclosure.

Referring to FIG. 5, at step 502, the method 500 may include receiving historical closed purchase order data. In an example embodiment, the supplier assurance delivery engine may receive last three years historical purchase order data. At step 504, the method 500 may include cleaning and transforming the received data, as described herein above. In an example embodiment, the method 500 may include performing missing value treatments, outlier corrections, and appropriate transformations to normalize the data. Thereafter, the method 500, at step 506, may include performing feature engineering on the transformed data to identify the most significant features modelling for each unit in the supply chain. Feature engineering may help in improving the prediction accuracy and reduce noise in the modelling. Based on the feature engineering, the method 500, at step 508, may include calculating the delay associated with each purchase order, which may become a response variable in the modelling.

At step 510, the method 500 may include building a set of prediction models for each unit (i.e., business unit) in the supply chain based on optimized model parameters, significant features, and response variable. In an example embodiment, the set of prediction models may be built using in-built machine learning algorithms in prediction tools such as, for example, R and Python. Each machine learning model may have its own parameters to be set up, for example, in XGBoost, parameters like n_estimators, max_depth, gamma, may need to be set up. Similarly, for Random Forest, NTree, and MTry i.e. number of times the decision trees to be trained, may be set up. These model parameters may be automatically optimized for best forecasting model. Further, to identify the best demand drivers for forecasting model based on the available data, the feature significance functionality may be used which automatically identifies the most significant drivers to be used for the modelling and develop the model accordingly.

Further, at step 512, the method 500 may include determining a best fit model from the set of prediction models for each unit in the supply chain. For example, the set of prediction models may include, but not be limited to, Random Forest, XGBoost, Light Gradient-Boosting Machine (GBM), or the like. A person of ordinary skill in the art will understand that LightGBM may refer to an ML model based on decision tree algorithms and used for ranking, classification, and other ML tasks. In an example embodiment, the method 500 may include applying the determined best fit model on the supply chain data to assess an impact of the supply chain data on the supply chain and also to predict a state associated with a purchase order.

Referring to FIG. 5, the method 500, at step 514, may include saving the determined best fit model for each unit in the supply chain. In an example embodiment, the determined best fit model for each unit may be saved or stored in a database such as the database 120 of FIG. 1. Further, at step 516, the method 500 may include saving feature importance using the determined best fit model for each unit in the supply chain. In an example embodiment, this information may be saved in the database 120. Furthermore, at step 520, the method 500 may include saving predictions associated with each unit in the database 120.

Referring to FIG. 5, at step 518, the method 500 may include feeding the predictions data in a dashboard such as a Tableau dashboard. At step 522, the method 500 may include predicting all open purchase orders using the saved best fit model. In an example embodiment, all open purchase orders may be predicted weekly 524-1. In another example embodiment, at step 524-2, the method 500 may include calculating an accuracy of the predictions based on actual outcomes.

It will be appreciated that the steps shown in FIG. 5 are merely illustrative. Other suitable steps may be used to implement the supplier assurance delivery engine, if desired. Moreover, the steps of the method 500 may be performed in any order and may include additional steps.

Figure 6A:
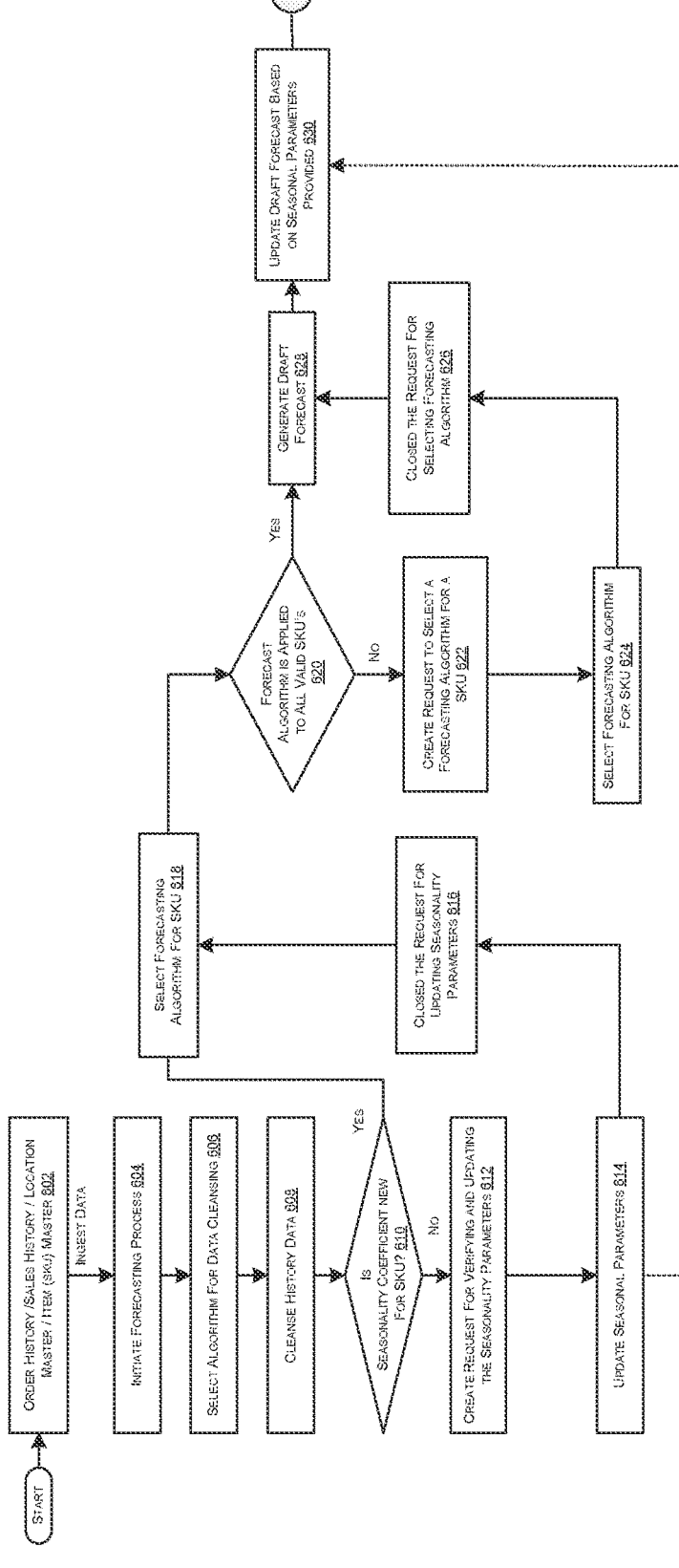
FIGS. 6A-6B illustrate exemplary flow chart of a method for demand forecasting by a demand forecaster of the proposed system, in accordance with embodiments of the present disclosure.
Figure 6B:
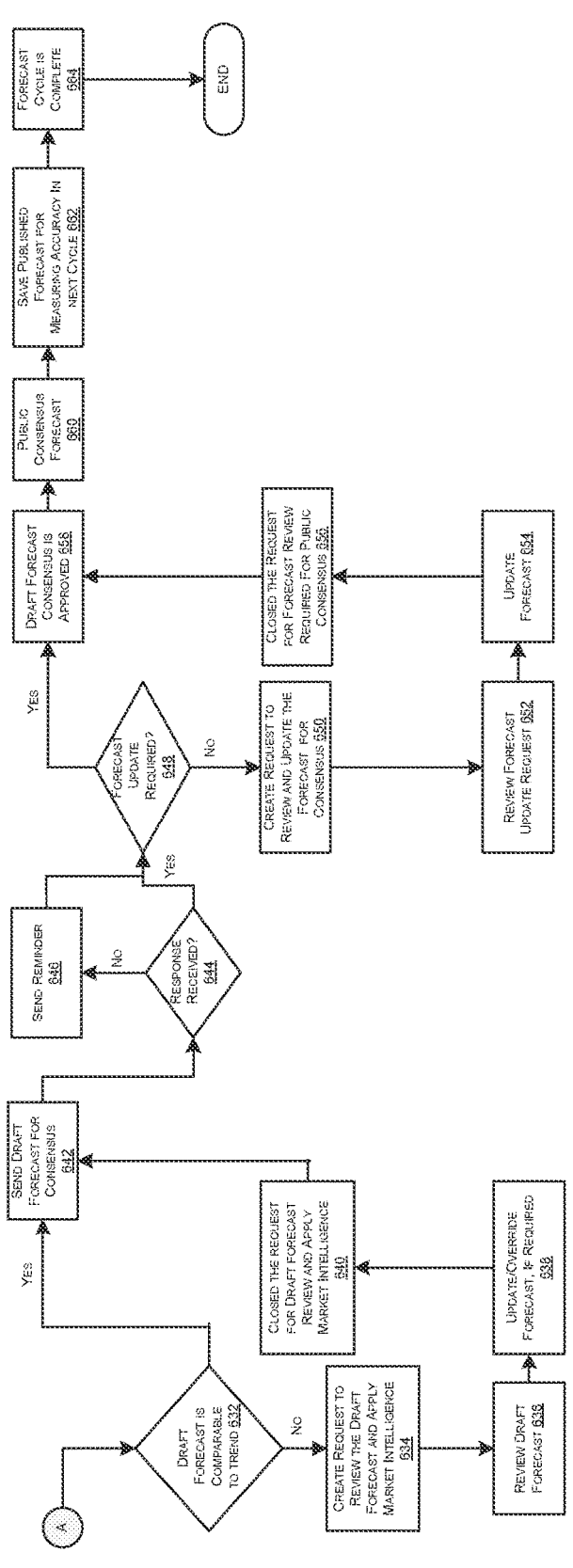

FIGS. 6A-6B illustrate exemplary flow chart (600A, 600B, herein referred as 600) of a method for demand forecasting by a demand forecaster such as the demand forecaster 306 of FIG. 3 of the system, in accordance with embodiments of the present disclosure.

Referring to FIG. 6A, at step 602, the method 600 may include receiving data from an integration engine, for example, but not limited to, purchase order data, sales history data, and master data. At step 604, the demand forecaster 306 may initiate forecasting process. In an example embodiment, at step 606, the method 600 may include selecting an appropriate algorithm or model for data cleaning such as, but not limited to, K-Nearest neighbor, Cook's D, DFBETA, etc.

Based on the selected algorithm, the demand forecaster 306 may clean the data at step 608. Further, at step 610, the method 600 may include determining whether there are new seasonality coefficients for a particular SKU. If yes, the method 600 may include selecting a forecasting model for the SKU at step 618. However, if not, the method 600 may proceed to step 612. In particular, at step 612, the demand forecaster 306 may create a request for verifying and updating the seasonality coefficients. Based on the created request, the method 600, at step 614, may include updating the seasonality coefficients. In response to the updating, the method 600, at step 616, may include closing the request for updating the seasonality coefficients and proceeding to step 618 to select a forecasting model for the SKU.

Referring to FIG. 6A, at step 620, the method 600 may include determining whether the selected forecasting model is applied to all valid SKUs. If yes, the method 600, at step 628, may include generating a draft forecast. However, if not, the method 600 may proceed to step 622. At step 622, the method 600 may include creating a request to select a forecasting algorithm for a SKU. Based on the created request, the demand forecaster 306 may select a forecasting algorithm for the SKU at step 624. Once the forecasting algorithm is selected and applied, the method 600, at step

626, may include closing the request for selecting the forecasting algorithm, and proceed to step 628 to generate the draft forecast. Further, at step 630, the method 600 may include updating the draft forecast based on seasonality coefficients provided from step 614.

Referring to FIG. 6B, at step 632, the method 600 may include determining whether the updated draft forecast is comparable to trend. If yes, the method 600, at step 642, may include sending the updated draft forecast for consensus. However, if not, the method 600 may proceed to step 634. At step 634, the method 600 may include creating a request to review the draft forecast and apply market intelligence, as the draft forecast is incomparable to the trend. Based on the created request, the demand forecaster 306 may allow an administrator or an agent to review the draft forecast at step 636. Based on the review, the method 600, at optional step 638, may include updating or overriding the draft forecast. Thereafter, the method 600, at step 640, may include closing the request for reviewing the draft forecast and proceed to step 642 to send the draft forecast for consensus. In an example embodiment, the draft forecast may be sent to the administrator or the agent or to the client systems.

Further, at step 644, the method 600 may include determining whether a response for consensus has been received. If not, the method 600 may include sending a reminder for the response at step 646. If the response has been received, the method 600 may include whether an update is required in the draft forecast at step 648. In an example embodiment, the demand forecaster 306 may determine whether an update is required in the draft forecast based on the consensus (i.e., response) received.

Referring to FIG. 6B, if it is determined that an update is required, the method 600 may include determining that the draft forecast consensus is approved at step 658. However, if it is determined that an update is not required, the method 600 may include creating a request to review and update the draft forecast for consensus at step 650. Based on the created request, the agent may review the request at step 652 and update the draft forecast at step 654. Thereafter, at step 656, the method 600 may include closing the request for forecast review and proceed to step 658 to determine that the draft forecast consensus is approved. At step 660, the draft forecast is determined as public consensus forecast data. Further, at step 662, the published forecast data is saved for measuring accuracy in a next cycle, and the forecast cycle is complete at step 664.

It will be appreciated that the steps shown in FIGS. 6A-6B are merely illustrative. Other suitable steps may be used to implement the demand forecasting process, if desired. Moreover, the steps of the method 600 may be performed in any order and may include additional steps.

FIGS. 7A-7E illustrate exemplary flow chart (700A-700E, herein referred as 700) of a method for inventory optimization and replenishment planning, in accordance with some embodiments of the present disclosure.

Figure 7A:
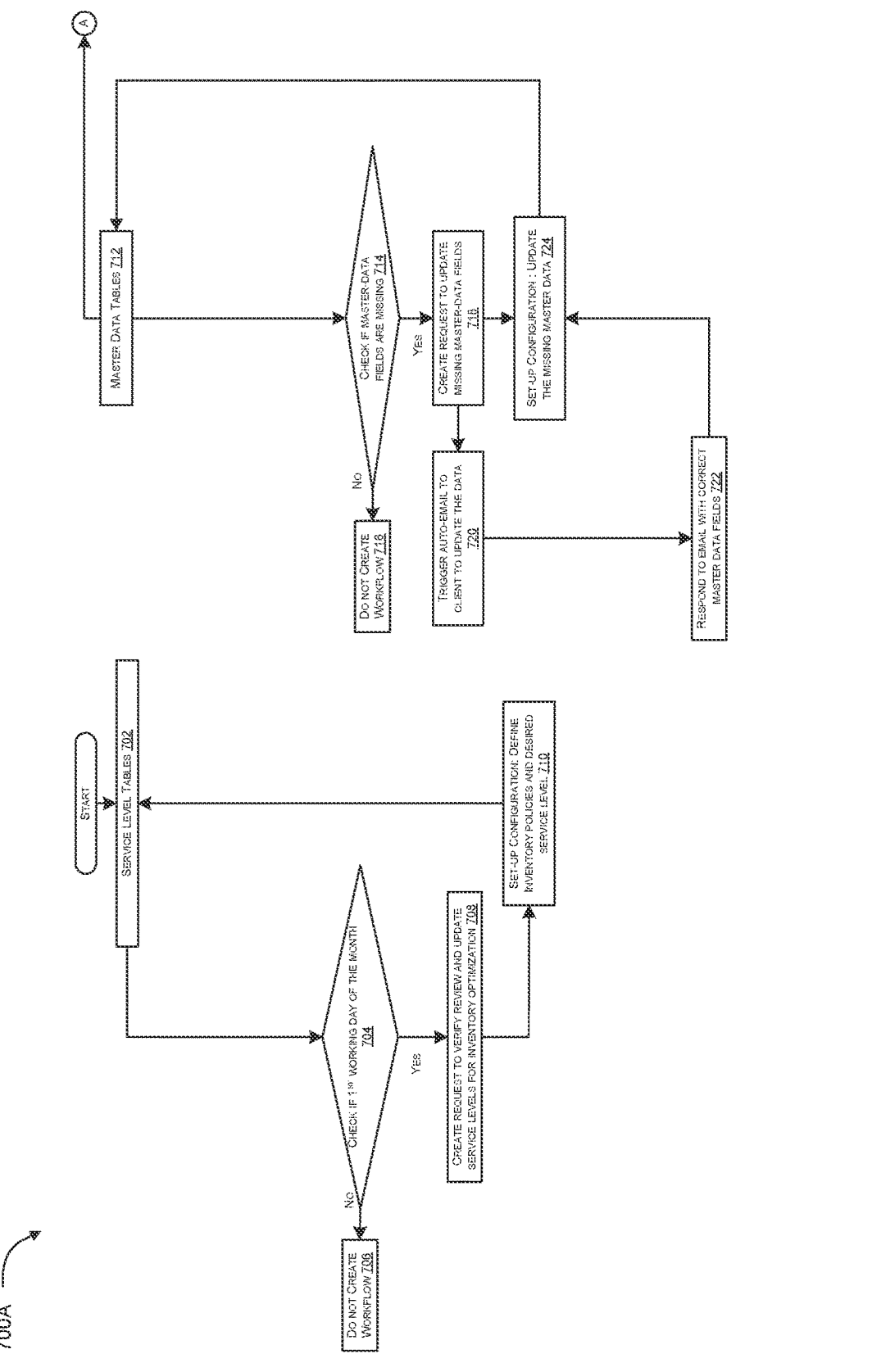
FIGS. 7A-7E illustrate exemplary flow chart of a method for inventory optimization and replenishment planning, in accordance with some embodiments of the present disclosure.

Referring to FIG. 7A, at step 702, the method 700 may include receiving service level data tables. At step 704, the method 700 may include checking if it is a first working day of a month. If not, the method 700, at step 706, may proceed to not creating a workflow. If yes, the method 700, at step 708, may include creating a request to verify, review, and update service levels for inventory optimization in the service level data tables. Based on the created request, the method 700, at step 710, may include defining inventory policies and desired service levels for inventory optimization.

Further, at step 712, the method 700 may include receiving master data tables. At step 714, the method 700 may include checking if any field of the master data table is missing. If not, the method 700, at step 716, may proceed to not creating a workflow. If yes, the method 700, at step 718, may include creating a request to update the missing fields in the master data table. Based on the created request, the method 700, at step 720, may include triggering an e-mail to client systems to update the missing fields in the master data table. In an example embodiment, the e-mail may be triggered automatically to the client systems. At step 722, the method 700 may include receiving a response from the client systems with correct and/or updated fields in the master data table. Thereafter, the method 700, at step 724, may include updating the missing fields in the master data table based on the response received from the client systems.

Figure 7B:
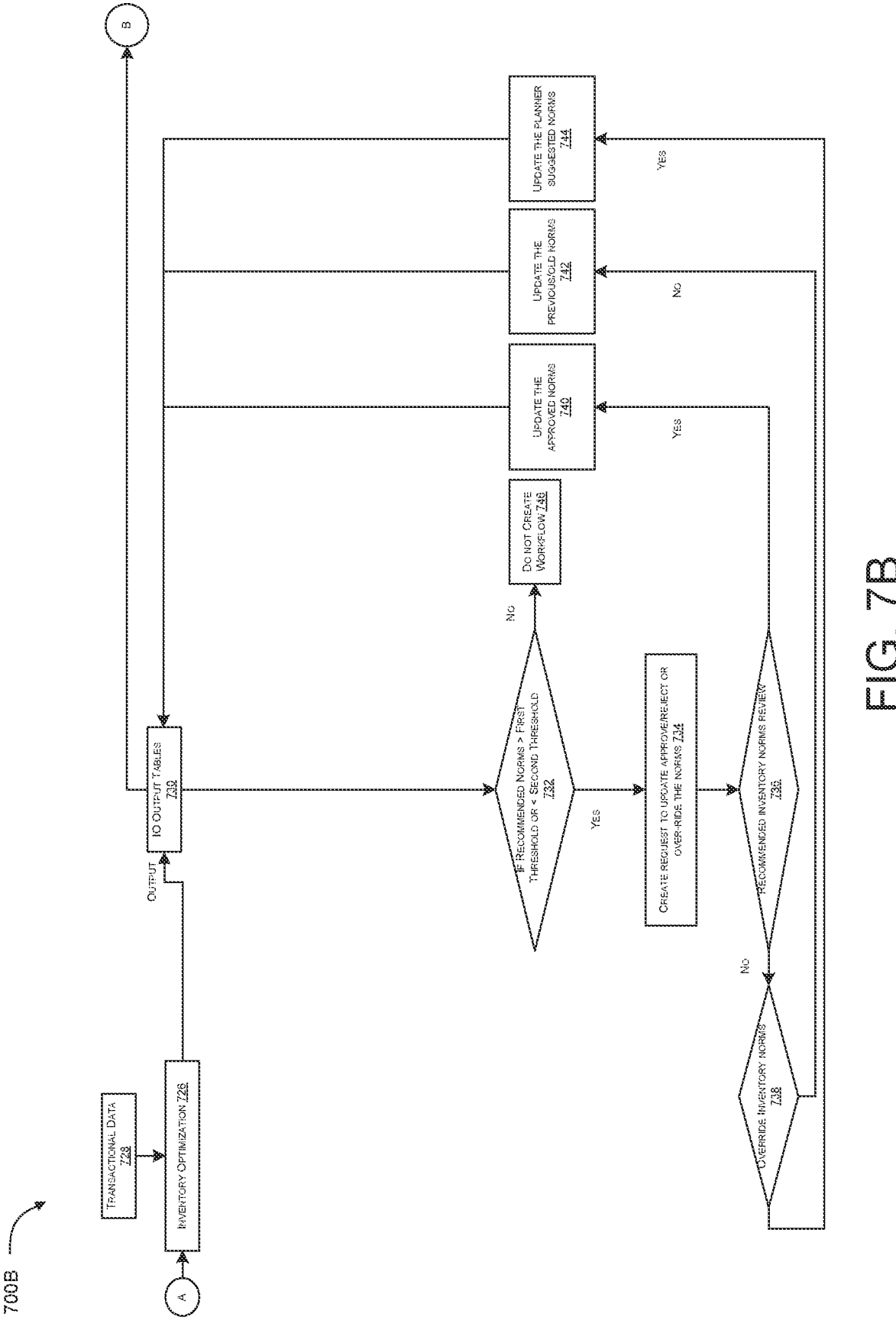

Referring to FIG. 7B, the service level data tables and the master level data tables may be provided to an inventory optimizer for inventory optimization at step 726. In an example embodiment, transactional data 728 may also be provided to the inventory optimizer for inventory optimization at step 726. Based on the inventory optimization, the method 700, at step 730, may include creating inventory optimization tables. In an example embodiment, the inventory optimization may include creating recommended inventory norms based on the updated service level data tables and the master level data tables.

Further, at step 732, the method 700 may include determining if the current inventory stock is greater than a first threshold, i.e. 1.1 times the current inventory norm, or less than a second threshold, i.e. 0.9 times the current inventory norm. Based on a positive determination, the method 700, at step 734, may include creating a request to update, approve, reject, or override the inventory norm. Further, at step 736, the method 700 may include reviewing the recommended inventory norm. In response to a positive review, the method 700 may include updating the current inventory norm with the recommended (i.e. approved) inventory norm at step 740.

At step 738, the method 700 may include determining whether to override the current inventory norms. In response to a negative override determination, the method 700 may include updating the current inventory norm at step 742. In response to a positive override determination, the method 700 may include updating the current inventory norms with the recommended inventory norm at step 744.

Referring to FIG. 7B, in response to a negative determination at step 732, the method 700, at step 746, may proceed to not creating a workflow. Thereafter, the inventory optimization tables 730 may be updated and provided for replenishment/supply planning.

Figure 7C:
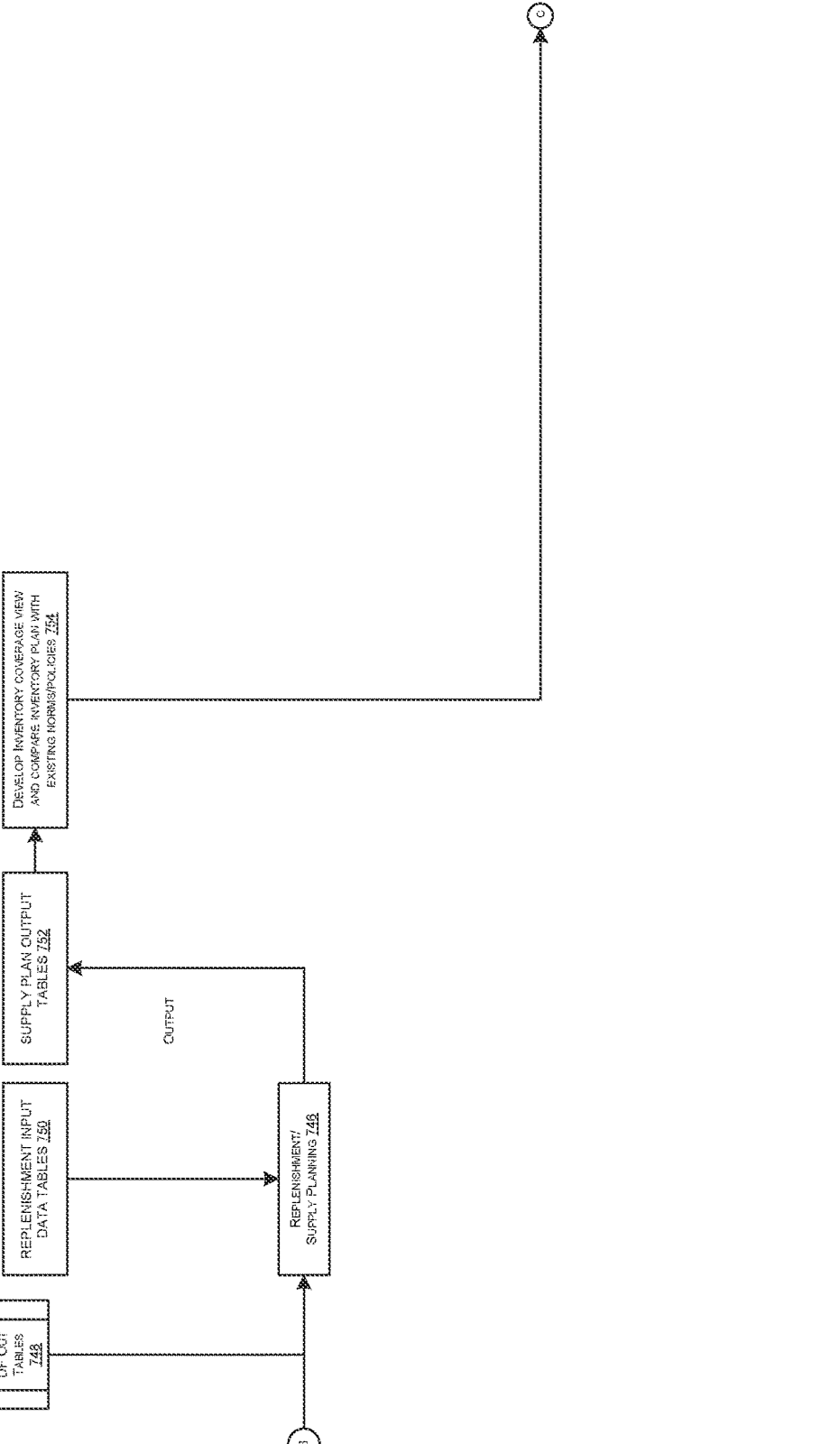

Referring to FIG. 7C, the method 700, at step 748, may include providing demand forecast data (from FIGS. 6A-6B) for replenishment/supply planning at step 746. In addition, replenishment input data tables 750 may also be provided for replenishment/supply planning. Based on the planning, the method 700, at step 752, may include generating supply plan tables.

Further, at step 754, the method 700 may include developing inventory coverage view and comparing inventory plan/replenishment plan with current norms and policies.

Figure 7D:
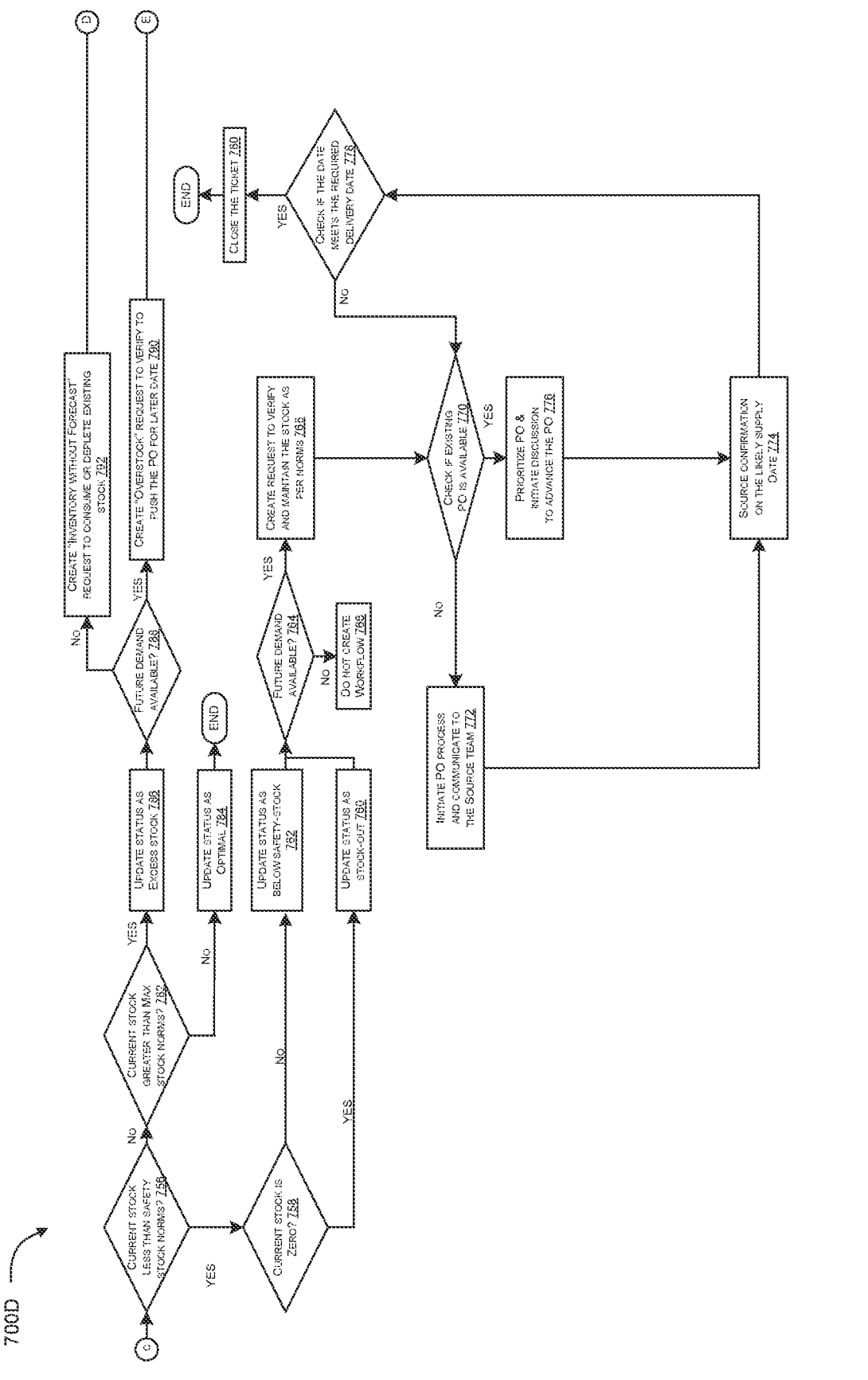

Referring to FIG. 7D, the method 700, at step 756, may include checking if current stock is less than safety stock norms (or threshold). If the current stock is less than the safety stock threshold, the method 700, at step 758, may include determining if the current stock is zero. In case the current stock is zero, the method 700 may include updating a status of the inventory as stock out at step 760, and proceeding to step 764. In case the current stock is not zero, the method 700 may include updating the status of the inventory as below safety stock at step 762.

Further, at step 764, the method 700 may include determining whether future is available. If not, the method 700, at step 766, may proceed to not creating a workflow. If yes, the method 700 may include creating a request to verify and maintain the stock as per the optimized inventory norms at step 768.

Referring to FIG. 7D, at step 770, the method 700 may include checking if there is an existing purchase order. If not, the method 700, at step 772, may include initiating a purchase order process and communicating to a source team. At step 774, the method 700 may include receiving a confirmation from the source team on a likely supply date. If an existing purchase order is available at step 770, the method 700 may include prioritizing the purchase order and initiating a discussion with the source team to advance the purchase order at step 776. Further, at step 778, the method 700 may include determining if the likely supply date meets the required delivery date in the purchase order. Thereafter, the ticket/request is closed at step 780.

Referring to FIG. 7D, if, at step 756, it is determined that the current stock is more than the safety stock threshold, the method 700 may include checking if the current stock is more than a maximum stock threshold at step 782. If not, the method 700 may include updating the status of the stock as optimal at step 784. If yes, the method 700 may include updating the status of the stock as excess stock at step 786. Further, at step 788, the method 700 may include determining if future demand is available. If yes, the method 700, at step 790, may include creating an overstock request to verify to push the purchase order for later date.

Figure 7E:
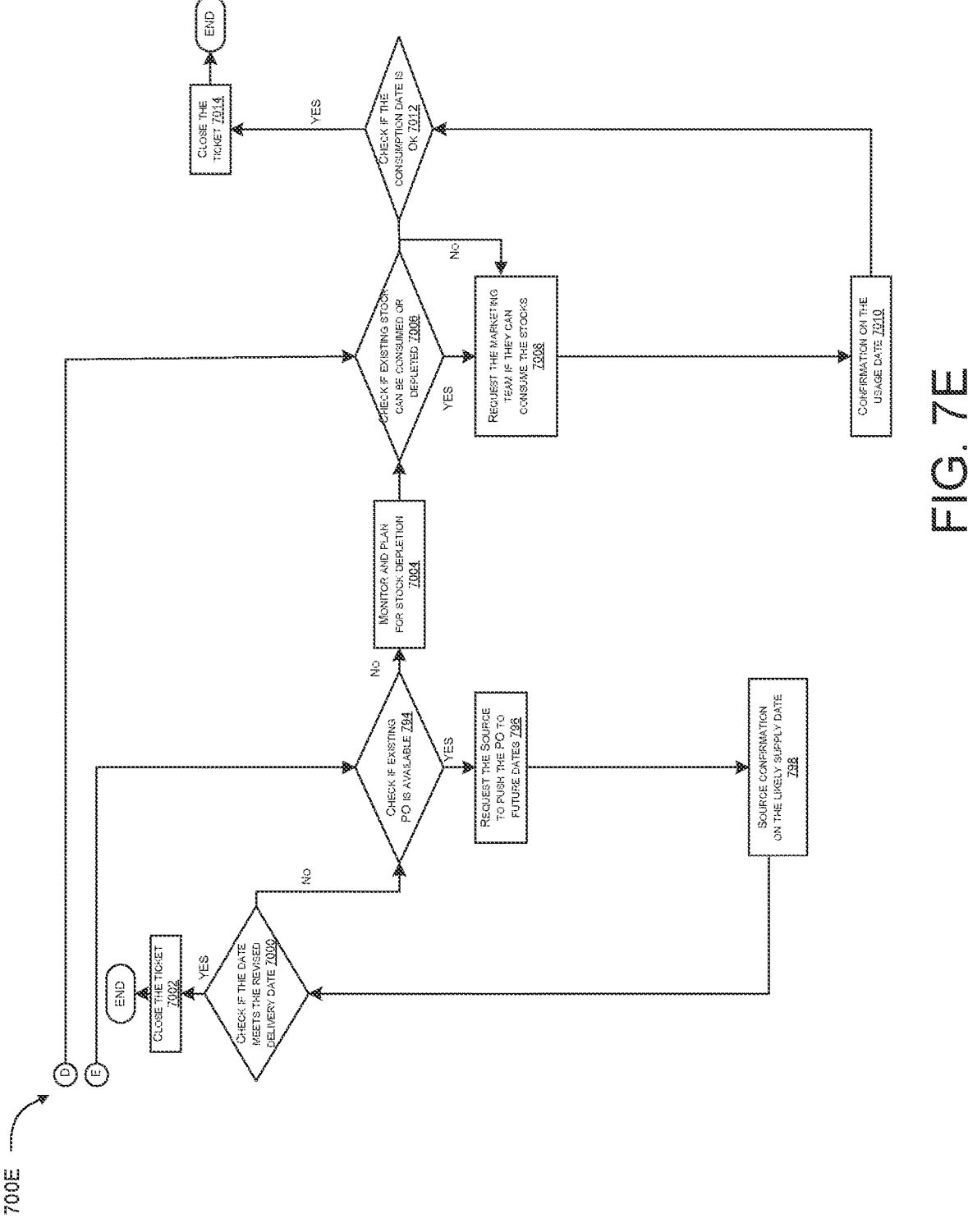

Referring to FIG. 7E, the method 700 may proceed to check if an existing purchase order is available at step 794. If yes, the method 700 may include requesting the source team to push the purchase order to future dates at step 796. Thereafter, the method 700, at step 798, may include receiving a confirmation from the source team on the likely supply date. Further, the method 700, at step 7000 may check if the likely supply date meets the revised delivery date. Thereafter, the ticket is closed at step 7002.

Referring to step 794, if an existing purchase order is not available, the method 700 may include monitoring and planning to stock depletion at step 7004. Further, the method 700, at step 7006, may include checking if the stock can be consumed or depleted.

Referring to step 788 of FIG. 7D, if future demand is not available, the method 700 may include creating an inventory without forecast request to consume or deplete the existing stock at step 792, and proceed to step 7006 of FIG. 7E.

If the existing stock can be consumed or depleted, the method 700 may include requesting a marketing team if they can consume the existing stock at step 7008. If the existing stock cannot be consumed or depleted, the method 700 may include requesting the marketing team to run promotions, ask buyers to check for buyback, and if none of these are possible, write off items. Further, the method 700 may include receiving a confirmation from the marketing team on the consumption date of the existing stock at step 7010. Furthermore, the method 700, at step 7012, may include checking if the consumption date is feasible for the inventory optimization. Thereafter, the ticket/request is closed at step 7014.

It will be appreciated that the steps shown in FIGS. 7A-7E are merely illustrative. Other suitable steps may be used to implement the inventory optimization and replenishment planning process, if desired. Moreover, the steps of the method 700 may be performed in any order and may include additional steps.

Figure 8:
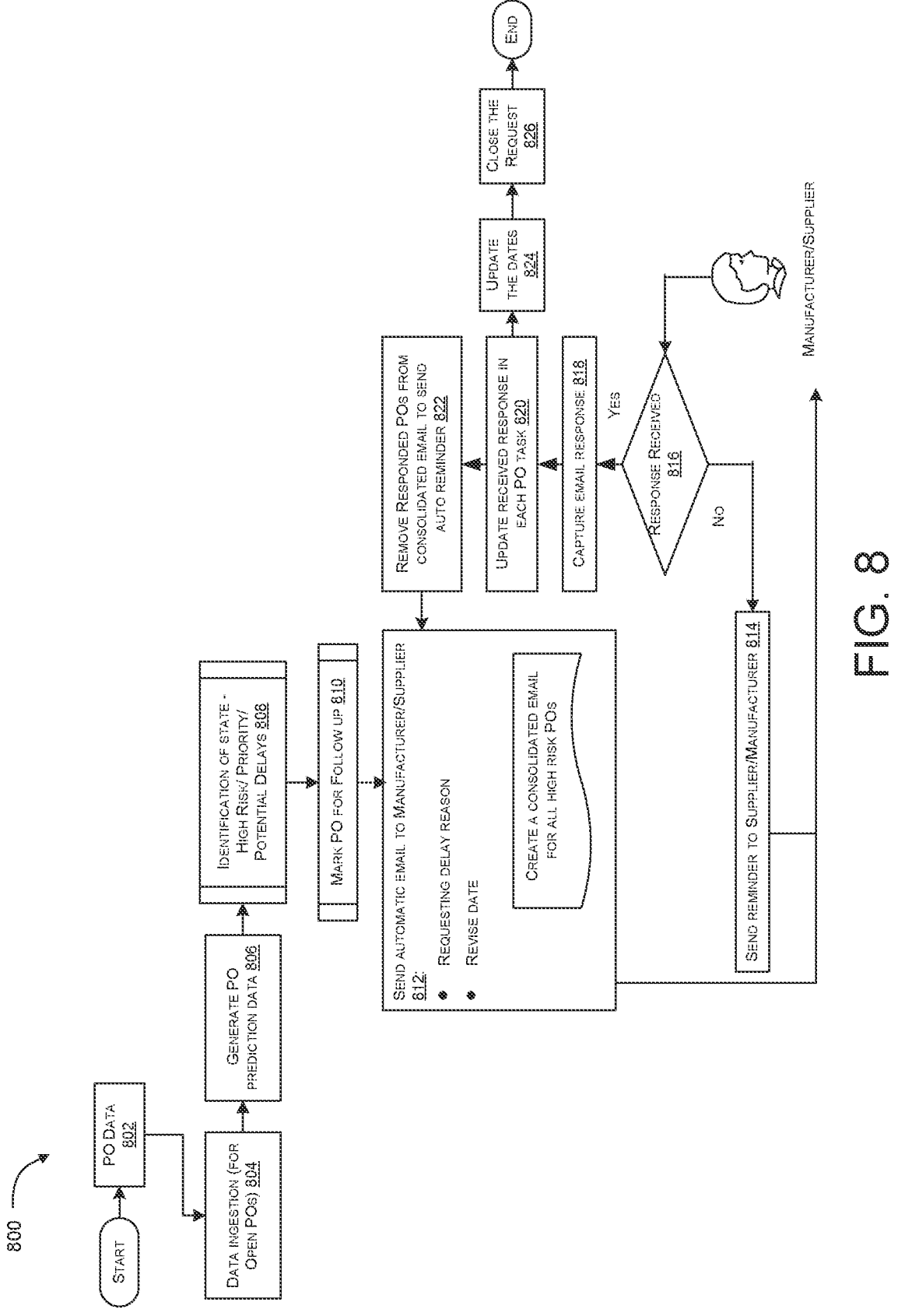
FIG. 8 illustrates an exemplary flow chart of a method for tracking open purchase orders, in accordance with some embodiments of the present disclosure.

FIG. 8 illustrates an exemplary flow chart 800 of a method for tracking open purchase orders, in accordance with some embodiments of the present disclosure.

Referring to FIG. 8, the method 800, at step 802, may include receiving purchase order data. At step 804, the method 800 may include ingesting the data for open purchase orders. Further, at step 806, the method 800 may include generating predictions for purchase orders. In an example embodiment, the method 800 may include predicting a state associated with the purchase order, for example, as delay, risk, or priority. Specifically, at step 808, the method 800 may include determining the state of the purchase order. Based on the predicted state, the method 800 may include marking the purchase order for follow up at step 810.

At step 812, the method 800 may include sending an automatic e-mail to a manufacturer or supplier associated with the purchase order. In an example embodiment, the automatic e-mail may be regarding requesting for a reason of delay associated with the purchase order and requesting for a revised date of delivery. In an example embodiment, the method 800 may include creating a consolidated e-mail for purchase orders based on the determined state, i.e. high risk.

Referring to FIG. 8, at step 816, the method 800 may include determining if a response to the e-mail has been received from the manufacturer or the supplier. If not, the method 800 may include sending a reminder to the manufacturer or the suppler at step 814. If yes, the method 800, at step 818, may include capturing the e-mail response to identify the reason for delay and the revised date. Further, at step 820, the method 800 may include updating the received response for each purchase order. The method 800 may include removing the responded purchase orders from the consolidated list to send reminders for purchase orders at step 822.

At step 824, based on the e-mail response, the method 800 may include updating the dates with the revised dates, and closing the request/ticket at step 826.

It will be appreciated that the steps shown in FIG. 8 are merely illustrative. Other suitable steps may be used to implement the tracking of purchase orders, if desired. Moreover, the steps of the method 800 may be performed in any order and may include additional steps.

FIG. 9 illustrates an exemplary method flow diagram 900 for the disclosed method for supply chain operational model, in accordance with some embodiments of the present disclosure. At step 902, the method 900 may include a step of receiving historical data from a set of data sources corresponding to a supply chain comprising at least a product. In an example embodiment, the set of data sources may include, but not be limited to, client systems, external applications, partners, or the like. In an example embodiment, the historical data may include, but not be limited to, timestamp, product identifier, organization code, location, date, and quantity, unit of measure, unit price, and currency.

Further, at step 904, the method 900 may include preprocessing the received historical data based on integration of the historical data from each of the set of data sources. In an example embodiment, an integration engine implemented in the disclosed system may integrate the data received from each of the set of data sources, and clean and transform the data to remove anomalies based on utilizing one or more state-of-the-art algorithms.

Furthermore, at step 906, the method 900 may include generating supply chain data based on the integrated historical data. In an example embodiment, the integrated historical data may include, but not be limited to, purchase order data, sales history data, master data, inventory data, open sales order data, or the like. In an example embodiment, the supply chain data may include, but not be limited to, demand forecast data, optimized inventory norm/plan, and replenishment plan.

Referring to FIG. 9, at step 908, the method 900 may include analyzing the supply chain data to assess an impact of the supply chain data on the supply chain. In an example embodiment, an orchestration engine may be implemented in the disclosed system for analyzing the supply chain data. In an example embodiment, the method 900 may include generating a set of prediction models for each unit (i.e. business unit) in the supply chain. Further, the method 900 may include determining a best fit model from the set of prediction models for each unit in the supply chain, and applying the determined best fit model on the supply chain data to assess the impact of the supply chain data on the supply chain.

Further, at step 910, the method 900 may include predicting a state associated with a purchase event of the product in the supply chain based at least on the analysis and the assessed impact of the supply chain data on the supply chain. In an example embodiment, the state may include, but not be limited to, an ID of the product and an attribute of the supply chain data causing the state associated with the purchase event. In an example embodiment, the attribute causing the state may be based on the demand forecast data, the optimized inventory plan, and the replenishment plan. In another example embodiment, the method 900 may include predicting the state associated with the purchase event based on the replenishment plan. In an example embodiment, the state may correspond to, but not limited to, a delay, a priority, and a risk associated with the purchase event for the product in the supply chain.

Referring to FIG. 9, at step 912, the method 900 may include generating a resolution flow to be executed at a respective unit in the supply chain for managing the predicted state associated with the purchase event of the product. In an example embodiment, the resolution flow may include at least one task to be executed to effectively manage the predicted state for the purchase event.

For example, the disclosed system may trigger a resolution, such as, for example, supplier responsiveness for improvement. Based on the resolution, the system may mitigate the root cause by executing a task such as, for example, transfer of goods from another storage location to prevent the stock outs. It may be appreciated that the above-mentioned example may only be exemplary and several other types of issues or problems related to supply chain may be evaluated and/or mitigated by the system and method of the present disclosure.

In an example embodiment, the disclosed system may be applied for intelligent data quality transformation, for example, 90% data quality compliance and may include 80-90% effort and error reduction in cloud data execution. In another example embodiment, in case of an engineering data digitization process, the system may allow more than 5 times cost improvement and enabling automated document life-cycle management. In another example embodiment, the system may be utilized for automating test bench, for example, including 40% productivity improvement by automating test processes. In digital twin access, the system may be about 10-20% faster time to market, and may have improved efficiency and reduced cost. In another example embodiment, under optimizing inventory management, the system may have about 10% inventory reduction based on equipment reliability. In another example embodiment, under integrating spare parts management, the system may result in reduced downtime due to improved availability of spare parts and reduction in inventory by 10%. In another example embodiment, under optimizing warranty claims, the system may have about 40% faster claims processing and about 90% accuracy in classification. In another example embodiment, under the increasing forecast accuracy for spare parts, the system may have about 10% increase in forecast accuracy with respect to baseline and about 15% reduction of safety stocks.

Figure 10:
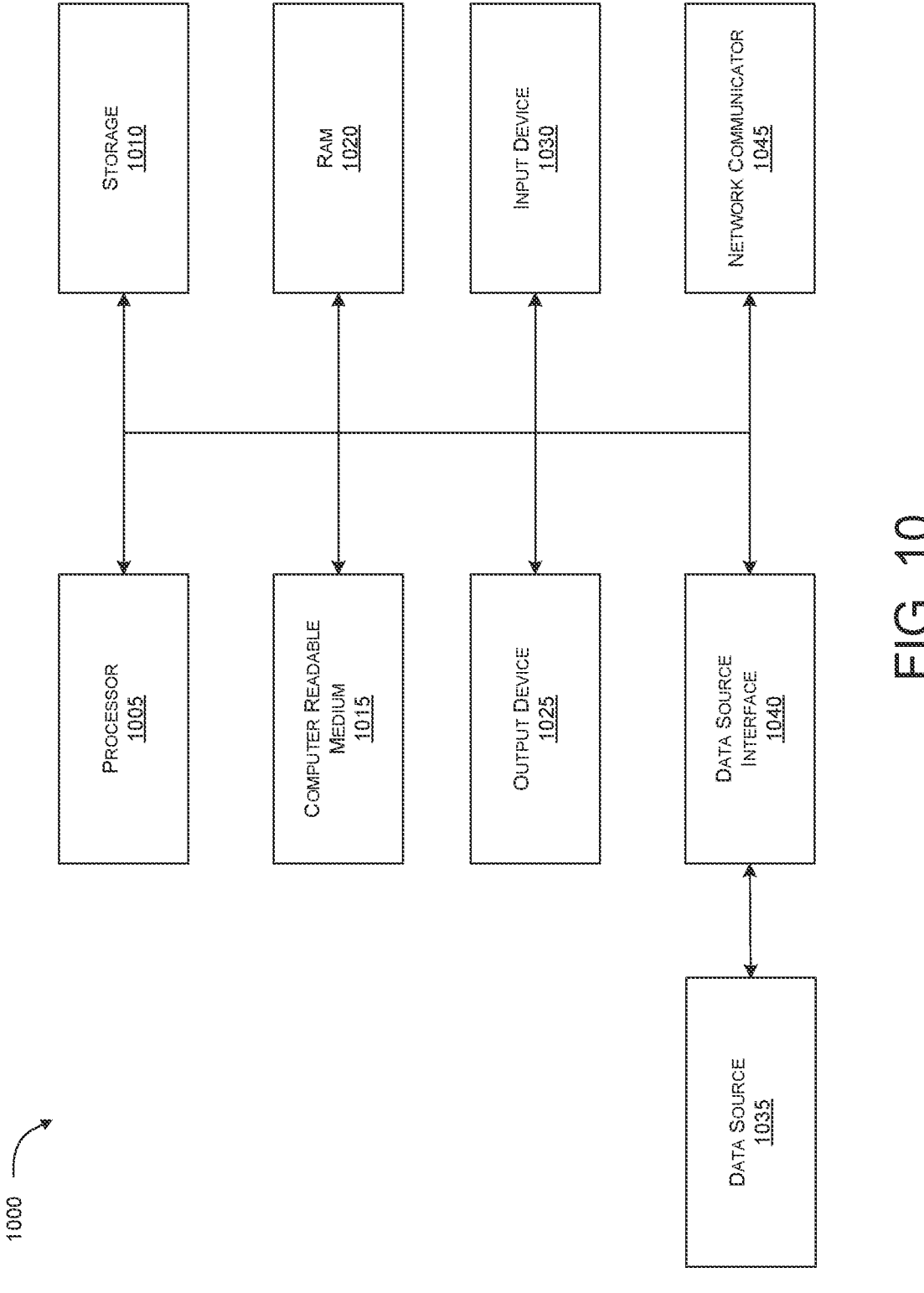
FIG. 10 illustrates an exemplary hardware platform in which or with which embodiments of the present disclosure may be implemented.

FIG. 10 illustrates a hardware platform 1000 for implementation of the disclosed system. For the sake of brevity, construction and operational features of the system which are explained in detail above are not explained in detail herein. Particularly, computing machines, such as but not limited to internal/external server clusters, quantum computers, desktops, laptops, smartphones, tablets, and wearables which may be used to execute the system or may include the structure of the hardware platform 1000. As illustrated, the hardware platform 1000 may include additional components not shown, and that some of the components described may be removed and/or modified. For example, a computer system with multiple graphics processing units (GPUs) may be located on external-cloud platforms including Amazon Web Services, or internal corporate cloud computing clusters, or organizational computing resources, etc.

The hardware platform 1000 may be a computer system, such as the system, that may be used with the embodiments described herein. The computer system may represent a computational platform that includes components that may be in a server or another computer system. The computer system may execute, by the processor 1005 (e.g., a single or multiple processors) or other hardware processing circuit, the methods, functions, and other processes described herein. These methods, functions, and other processes may be embodied as machine-readable instructions stored on a computer-readable medium, which may be non-transitory, such as hardware storage devices (e.g., random access memory (RAM), read-only memory (ROM), erasable programmable ROM (EPROM), electrically erasable programmable ROM (EEPROM), hard drives, and flash memory). The computer system may include the processor 1005 that executes software instructions or code stored on a non-transitory computer-readable storage medium 1015 to perform methods of the present disclosure. The software code includes, for example, instructions to capturing at least one event associated to one or more requests received. In an example, components 104, 106, and 108 may be software codes or components performing these steps.

The instructions on the computer-readable storage medium 1015 are read and stored the instructions in storage 1010 or in RAM 1020. The storage 1010 may provide a space for keeping static data where at least some instructions could be stored for later execution. The stored instructions may be further compiled to generate other representations of the instructions and dynamically stored in the RAM, such as RAM 1020. The processor 1005 may read instructions from the RAM 1020 and perform actions as instructed.

The computer system may further include the output device 1025 to provide at least some of the results of the execution as output including, but not limited to, visual information associated to supply chain performance, or the like. The output device 1025 may include a display on computing devices and virtual reality glasses. For example, the display may be a mobile phone screen or a laptop screen. Graphical user interfaces (GUIs) and/or text may be presented as an output on the display screen. The computer system may further include an input device 1030 to provide a user or another device with mechanisms for entering data and/or otherwise interact with the computer system. The input device 1030 may include, for example, a keyboard, a keypad, a mouse, or a touchscreen. Each of these output devices 1025 and input devices 1030 may be joined by one or more additional peripherals. For example, the output device 1025 may be used to display supply chain performance data, plan, or the like by the system.

A network communicator 1045 may be provided to connect the computer system to a network and in turn to other devices connected to the network including other clients, servers, data stores, and interfaces, for instance. A network communicator 1045 may include, for example, a network adapter, such as a local area network (LAN) adapter or a wireless adapter. The computer system may include a data sources interface 1040 to access the data source 1035. The data source 1035 may be an information resource. As an example, a database of exceptions and rules may be provided as the data source 1035. Moreover, knowledge repositories and curated data may be other examples of data source 1035.

One of ordinary skill in the art will appreciate that techniques consistent with the present disclosure are applicable in other contexts as well without departing from the scope of the disclosure.

What has been described and illustrated herein are examples of the present disclosure. The terms, descriptions, and figures used herein are set forth by way of illustration only and are not meant as limitations. Many variations are possible within the spirit and scope of the subject matter, which is intended to be defined by the following claims and their equivalents in which all terms are meant in their broadest reasonable sense unless otherwise indicated.

The invention claimed is:

1. A system, comprising:
a processor; and
a memory coupled with the processor, wherein the memory stores instructions which when executed by the processor cause the processor to:
  receive data from a set of data sources corresponding to a supply chain associated with at least a product, wherein the set of data sources includes a plurality of client systems;
  integrate, via an integration engine, the data received from the set of data sources, wherein the integration engine includes:
    a neutral sublayer component corresponding to a first set of endpoints used for at least one client system of the plurality of client systems;
    a system sublayer component corresponding to a second set of endpoints configured based on a specific type of client system, wherein the system sublayer component allows the system to reuse connectivity capabilities across the plurality of client systems; and
    a client sublayer component configured based on a client environment, wherein the client sublayer component connects the system to a specific client system of the plurality of client systems;
  pre-process the received data based on the integration of the data from each of the set of data sources;
  generate supply chain data based on the integrated data;
  analyze, via an orchestration engine, the generated supply chain data to assess an impact of the generated supply chain data on the supply chain, wherein the processor is configured to analyze the generated supply chain data by:
    performing a feature engineering technique on the integrated data to identify features from the integrated data for modelling a set of prediction machine learning (ML) models for each unit in the supply chain;
    generating a response variable in the modelling based on the feature engineering technique;
    optimizing model parameters by identification of best demand drivers for the modelling of the set of prediction ML models based on the features of the integrated data:
    generating the set of prediction ML models for each unit based on the optimized model parameters, the features of the integrated data, and the response variable;
    determining a best fit model from the set of prediction ML models for each unit in the supply chain; and
    applying the determined best fit model on the generated supply chain data to assess the impact of the generated supply chain data on the supply chain;
  based on the analysis and the assessed impact, predict, via the orchestration engine, a state associated with an event in the supply chain, wherein the state comprises an attribute of the generated supply chain data causing the state; and
  generate a resolution flow to be executed in the supply chain for managing the predicted state associated with the event in the supply chain.

2. The system of claim 1, wherein the data comprises at least one of: time stamp, product identifier, organization code, location, date, quantity, unit of measure, unit price, and currency.

3. The system of claim 1, wherein the processor is to pre-process the data by cleaning and transforming the integrated data to remove anomalies.

4. The system of claim 1, wherein the supply chain data comprises demand forecast data, an optimized inventory plan, and a replenishment plan, and wherein the attribute causing the state associated with the event is based on the demand forecast data and the optimized inventory plan.

5. The system of claim 4, wherein the processor is to generate the demand forecast data by:
selecting a forecasting model based on the received data and a set of parameters associated with the product in the supply chain; and
applying the selected forecasting model on the data and the set of parameters to generate the demand forecast data.

6. The system of claim 5, wherein the processor is to generate the optimized inventory plan by:
analyzing the received data, the generated demand forecast data, and transactional data;
determining a recommended inventory norm based on the analyzed data;
comparing current stock with a current inventory norm; and based on the determination and the comparison, determining the optimized inventory plan.

7. The system of claim 6, wherein the processor is to compare the current stock with the current inventory norm by determining whether the current stock is greater than a first threshold or less than a second threshold.

8. The system of claim 7, wherein the processor is to:
   in response to a positive determination, generate the optimized inventory plan based on the current inventory norm;
   in response to a negative determination, determine whether to override the current inventory norm with the recommended inventory norm;
   in response to a positive override determination, generate the optimized inventory plan based on the recommended inventory norm; and
   in response to a negative override determination, generate the optimized inventory plan based on the current inventory norm.

9. The system of claim 6, wherein the processor is to generate the replenishment plan based on the generated demand forecast data and the optimized inventory plan, and wherein the replenishment plan is associated with the event for the product in the supply chain.

10. The system of claim 9, wherein the processor is to predict the state associated with the event further based on the replenishment plan.

11. The system of claim 1, wherein the state associated with the event corresponds to at least one of a delay, a priority, and a risk associated with the event in the supply chain.

12. The system of claim 1, wherein the processor is to generate the resolution flow for managing the predicted state by:
   determining whether current stock of the product associated with the event is less than a safety threshold;
   in response to a positive determination, verifying and maintaining the current stock for the product based on an optimized inventory plan of the supply chain data; and
   in response to a negative determination, determining whether the current stock of the product is more than a maximum stock threshold.

13. The system of claim 12, wherein the processor is to:
   in response to a determination that the current stock of the product is more than the maximum stock threshold, create a request to consume the current stock based on demand forecast data of the supply chain data and the event; and
   in response to a determination that the current stock of the product is less than the maximum stock threshold, update the state for the product as optimal.

14. A method, comprising:
   receiving, by a processor, data from a set of data sources corresponding to a supply chain associated with at least a product, wherein the set of data sources includes a plurality of client systems;
   integrating, by a processor including an integration engine, the data received from the set of data sources, wherein the integration engine includes:
      a neutral sublayer component corresponding to a first set of endpoints used for at least one client system of the plurality of client systems;
      a system sublayer component corresponding to a second set of endpoints configured based on a specific type of client system, wherein the system sublayer component allows the system to reuse connectivity capabilities across the plurality of client systems; and
      a client sublayer component configured based on a client environment, wherein the client sublayer component connects the system to a specific client system of the plurality of client systems;
   pre-processing, by the processor, the received data based on the integration of the data from each of the set of data sources;
   generating, by the processor, supply chain data based on the integrated data;
   analyzing, by the processor via an orchestration engine, the generated supply chain data to assess an impact of the generated supply chain data on the supply chain, wherein the processor is configured to analyze the generated supply chain data by:
      performing a feature engineering technique on the integrated data to identify features from the integrated data for modelling a set of prediction machine learning (ML) models for each unit in the supply chain;
      generating a response variable in the modelling based on the feature engineering technique;
      optimizing model parameters by identification of best demand drivers for the modelling of the set of prediction ML models based on the features of the integrated data;
      generating the set of prediction ML models for each unit based on the optimized model parameters, the features of the integrated data, and the response variable;
      determining a best fit model from the set of prediction ML models for each unit in the supply chain; and
      applying the determined best fit model on the generated supply chain data to assess the impact of the generated supply chain data on the supply chain;
   based on the analysis and the assessed impact, predicting, by the processor via the orchestration engine, a state associated with a purchase event of the product in the supply chain, wherein the state comprises an identifier of the product and an attribute of the generated supply chain data causing the state; and
   generating, by the processor, a resolution flow to be executed in the supply chain for managing the predicted state associated with the purchase event of the product.

15. The method of claim 14, wherein the supply chain data comprises demand forecast data, optimized inventory plan, and a replenishment plan, and wherein the attribute causing the state associated with the purchase event is based on the demand forecast data, the optimized inventory plan, and the replenishment plan.

16. The method of claim 14, wherein the state associated with the purchase event corresponds to at least one of a delay, a priority, and a risk associated with the purchase event for the product in the supply chain.

17. The method of claim 14, wherein generating, by the processor, the resolution flow for managing the predicted state comprises:
   determining, by the processor, whether current stock of the product associated with the purchase event is less than a safety threshold;
   in response to a positive determination, verifying and maintaining, by the processor, the current stock for the product based on an optimized inventory plan of the supply chain data; and in response to a negative determination, determining, by the processor, whether the current stock of the product is more than a maximum stock threshold.

18. The method of claim 17, further comprising:

in response to a determination that the current stock of the product is more than the maximum stock threshold, creating, by the processor, a request to consume the current stock based on demand forecast data of the supply chain data and the purchase event; and in response to a determination that the current stock of the product is less than the maximum stock threshold, updating, by the processor, the state for the product as optimal.

19. A non-transitory computer-readable medium, wherein the readable medium comprises machine-executable instructions that are executable by a processor to:

receive data from a set of data sources corresponding to a supply chain associated with at least a product, wherein the set of data sources includes a plurality of client systems;

integrate, via an integration engine, the data received from the set of data sources, wherein the integration engine includes:

a neutral sublayer component corresponding to a first set of endpoints used for at least one client system of the plurality of client systems;

a system sublayer component corresponding to a second set of endpoints configured based on a specific type of client system, wherein the system sublayer component allows the system to reuse connectivity capabilities across the plurality of client systems; and a client sublayer component configured based on a client environment, wherein the client sublayer component connects the system to a specific client system of the plurality of client systems;

pre-process the received data based on the integration of the data from each of the set of data sources;

generate supply chain data based on the integrated data;

analyze, via an orchestration engine, the generated supply chain data to assess an impact of the generated supply chain data on the supply chain, wherein the processor is configured to analyze the generated supply chain data by:

performing a feature engineering technique on the integrated data to identify features from the integrated data for modelling a set of prediction machine learning (ML) models for each unit in the supply chain;

generating a response variable in the modelling based on the feature engineering technique;

optimizing model parameters by identification of best demand drivers for the modelling of the set of prediction ML models based on the features of the integrated data;

generating the set of prediction ML models for each unit based on the optimized model parameters, the features of the integrated data, and the response variable;

determining a best fit model from the set of prediction ML models for each unit in the supply chain; and applying the determined best fit model on the generated supply chain data to assess the impact of the generated supply chain data on the supply chain;

based on the analysis and the assessed impact, predict, via the orchestration engine, a state associated with a purchase event of the product in the supply chain, wherein the state comprises an identifier of the product and an attribute of the generated supply chain data causing the state; and generate a resolution flow to be executed in the supply chain for managing the predicted state associated with the purchase event of the product.

* * * * *